US010687359B2

(12) United States Patent
Yerramalli et al.

(10) Patent No.: US 10,687,359 B2
(45) Date of Patent: Jun. 16, 2020

(54) SYSTEM ACQUISITION IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/987,511

(22) Filed: May 23, 2018

(65) Prior Publication Data

US 2018/0343676 A1 Nov. 29, 2018

Related U.S. Application Data

(60) Provisional application No. 62/511,184, filed on May 25, 2017.

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 56/001* (2013.01); *H04W 74/08* (2013.01); *H04W 74/006* (2013.01)

(58) Field of Classification Search
CPC ... H04W 16/14; H04W 24/08; H04W 72/082; H04W 28/26; H04W 88/08; H04W 74/08;
(Continued)

(56) References Cited

U.S. PATENT DOCUMENTS

2015/0049741 A1 2/2015 Chen et al.
2015/0139113 A1* 5/2015 You ..................... H04L 5/003
370/329

(Continued)

OTHER PUBLICATIONS

International Search Report and Written Opinion—PCT/US2018/034419—ISA/EPO—dated Aug. 29, 2018.

*Primary Examiner* — Jung Liu
(74) *Attorney, Agent, or Firm* — Holland & Hart LLP

(57) ABSTRACT

Methods, systems, and devices for wireless communications are described. In some wireless systems utilizing shared radio frequency spectrum bands, base stations may operate in different listen before talk (LBT) modes. For example, a base station may operate in an LBT enabled mode or a non-LBT enabled mode. A UE may perform system acquisition with the base station based on receiving acquisition signals (e.g., synchronization signals and physical broadcast channel (PBCH) signals) from the base station. These acquisition signals may depend on the LBT mode of the base station. For example, the frame timing and number of subframes for the acquisition signals may be based on the LBT mode of the base station. In some cases, a base station may adaptively switch LBT modes, and the UE may re-synchronize with the base station based on an LBT configuration period or a paging message from the base station.

30 Claims, 19 Drawing Sheets

US 10,687,359 B2
Page 2

(51) Int. Cl.
*H04W 56/00* (2009.01)
*H04W 74/00* (2009.01)

(58) Field of Classification Search
CPC ............... H04W 8/24; H04W 72/1284; H04W 72/1289; H04W 72/0446; H04W 72/14; H04W 74/02; H04W 72/04
See application file for complete search history.

(56) References Cited

U.S. PATENT DOCUMENTS

| | | | |
|---|---|---|---|
| 2016/0135179 A1* | 5/2016 | Yin | H04J 11/0069 370/329 |
| 2017/0094681 A1* | 3/2017 | Takeda | H04W 16/14 |
| 2017/0135128 A1 | 5/2017 | Yerramalli et al. | |
| 2017/0164247 A1* | 6/2017 | Wiemann | H04W 36/0066 |
| 2017/0195889 A1* | 7/2017 | Takeda | H04W 16/14 |
| 2017/0215082 A1* | 7/2017 | Hwang | H04W 24/08 |
| 2017/0289818 A1* | 10/2017 | Ng | H04W 48/12 |
| 2018/0220462 A1* | 8/2018 | Kusashima | H04W 16/14 |
| 2019/0007896 A1* | 1/2019 | Ye | H04L 27/0006 |
| 2019/0037608 A1* | 1/2019 | Harada | H04W 16/14 |
| 2019/0090126 A1* | 3/2019 | Hayashi | H04W 72/0446 |
| 2019/0116005 A1* | 4/2019 | Harada | H04W 16/14 |
| 2019/0116489 A1* | 4/2019 | Harada | H04W 8/22 |
| 2019/0116615 A1* | 4/2019 | Harada | H04W 16/14 |
| 2019/0124678 A1* | 4/2019 | Harada | H04W 16/14 |

\* cited by examiner

SYSTEM ACQUISITION IN A SHARED RADIO FREQUENCY SPECTRUM BAND

CROSS REFERENCES

The present Application for Patent claims priority to U.S. Provisional Patent Application No. 62/511,184 by Yerramalli, et al., entitled "System Acquisition in a Shared Radio Frequency Spectrum Band," filed May 25, 2017, assigned to the assignee hereof.

BACKGROUND

The following relates generally to wireless communication, and more specifically to system acquisition in a shared radio frequency spectrum band, such as an unlicensed radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system or a New Radio (NR) system). A wireless multiple-access communications system may include a number of base stations or access network nodes, each simultaneously supporting communication for multiple communication devices, which may be otherwise known as user equipment (UE).

Some wireless communications systems may enable communication between a base station and a UE over shared radio frequency spectrum bands, such as an unlicensed radio frequency spectrum band. In some cases, when using a shared radio frequency spectrum band, base stations may perform contention-based channel access by performing a listen before talk (LBT) procedure according to contention-based rules that provide for fair channel access to transmitters that wish to use the shared radio frequency spectrum band. In other cases, base stations using the shared radio frequency spectrum band may transmit according to duty cycle and transmission time requirements to allow for fair channel access. A UE may perform system acquisition with a base station to transmit and receive data over the shared frequency spectrum band.

SUMMARY

The described techniques relate to improved methods, systems, devices, or apparatuses that support system acquisition in a shared radio frequency spectrum band, such as an unlicensed radio frequency spectrum band. Generally, the described techniques provide for a base station to transmit an indication of a listen before talk (LBT) mode of the base station to a user equipment (UE). In some cases, the indication of the LBT mode may be transmitted in a synchronization signal. The UE may receive the indication of the LBT mode, and may determine a physical broadcast channel (PBCH) configuration based on the indication. The base station may then transmit a PBCH transmission according to the PBCH configuration, which the UE may receive based on determining the PBCH configuration.

A method for wireless communications is described. The method may include receiving, over a shared radio frequency spectrum band, a transmission from a base station comprising an indication of an LBT mode of the base station, determining, based at least in part on the indication of the LBT mode of the base station, a PBCH configuration of the base station, and receiving a PBCH transmission according to the determined PBCH configuration.

An apparatus for wireless communications is described. The apparatus may include means for receiving, over a shared radio frequency spectrum band, a transmission from a base station comprising an indication of an LBT mode of the base station, means for determining, based at least in part on the indication of the LBT mode of the base station, a PBCH configuration of the base station, and means for receiving a PBCH transmission according to the determined PBCH configuration.

Another apparatus for wireless communications is described. The apparatus may include a processor, memory in electronic communication with the processor, and instructions stored in the memory. The instructions may be operable to cause the processor to receive, over a shared radio frequency spectrum band, a transmission from a base station comprising an indication of an LBT mode of the base station, to determine, based at least in part on the indication of the LBT mode of the base station, a PBCH configuration of the base station, and to receive a PBCH transmission according to the determined PBCH configuration.

A non-transitory computer-readable medium for wireless communications is described. The non-transitory computer-readable medium may include instructions operable to cause a processor to receive, over a shared radio frequency spectrum band, a transmission from a base station comprising an indication of an LBT mode of the base station, to determine, based at least in part on the indication of the LBT mode of the base station, a PBCH configuration of the base station, and to receive a PBCH transmission according to the determined PBCH configuration.

In some examples of the method, apparatus, and non-transitory computer-readable medium described above, determining the PBCH configuration of the base station comprises determining a periodicity of a synchronization signal block based at least in part on the LBT mode of the base station.

In some examples of the method, apparatus, and non-transitory computer-readable medium described above, determining the PBCH configuration of the base station comprises determining a periodicity of transmissions from the base station on an anchor frequency based at least in part on the LBT mode of the base station.

In some examples of the method, apparatus, and non-transitory computer-readable medium described above, determining the PBCH configuration of the base station comprises determining, based at least in part on the LBT mode of the base station, a number of subframes that follow a synchronization signal transmission.

In some examples of the method, apparatus, and non-transitory computer-readable medium described above, receiving the PBCH transmission comprises receiving, based at least in part on the determined number of subframes, the PBCH transmission over one or more subframes following the synchronization signal transmission. Some examples of the method, apparatus, and non-transitory computer-readable medium described above may further include processes, features, means, or instructions for decoding a master information block (MIB) based at least in part on the PBCH transmission.

Some examples of the method, apparatus, and non-transitory computer-readable medium described above may further include processes, features, means, or instructions for receiving a second PBCH transmission according to the determined PBCH configuration. Some examples of the method, apparatus, and non-transitory computer-readable medium described above may further include processes, features, means, or instructions for decoding a MIB based at least in part on the PBCH transmission and the second PBCH transmission.

Some examples of the method, apparatus, and non-transitory computer-readable medium described above may further include processes, features, means, or instructions for receiving a paging message from the base station, the paging message indicating a change in the LBT mode of the base station. Some examples of the method, apparatus, and non-transitory computer-readable medium described above may further include processes, features, means, or instructions for performing a re-synchronization process with the base station based at least in part on receiving the paging message.

Some examples of the method, apparatus, and non-transitory computer-readable medium described above may further include processes, features, means, or instructions for identifying an LBT mode configuration period of the base station, wherein determining the PBCH configuration of the base station may be based at least in part on the identified LBT mode configuration period of the base station. In some examples of the method, apparatus, and non-transitory computer-readable medium described above, identifying the LBT mode configuration period of the base station comprises receiving a message from the base station during the LBT mode configuration period.

In some examples of the method, apparatus, and non-transitory computer-readable medium described above, the PBCH transmission comprises subframe timing information, frame timing information, a frequency hopping bandwidth, a number of hopping frequencies, a location of system information, a frame structure for a data channel, or any combination thereof.

In some examples of the method, apparatus, and non-transitory computer-readable medium described above, the transmission from the base station comprises a synchronization signal. In some examples of the method, apparatus, and non-transitory computer-readable medium described above, the synchronization signal comprises a cell identifier, the cell identifier comprising the indication of the LBT mode of the base station.

A method for wireless communications is described. The method may include identifying, at a base station, an LBT mode of the base station, transmitting, over a shared radio frequency spectrum band, a transmission comprising an indication of the LBT mode of the base station, and transmitting a PBCH transmission according to a PBCH configuration, the PBCH configuration based at least in part on the LBT mode of the base station.

An apparatus for wireless communications is described. The apparatus may include means for identifying, at a base station, an LBT mode of the base station, means for transmitting, over a shared radio frequency spectrum band, a transmission comprising an indication of the LBT mode of the base station, and means for transmitting a PBCH transmission according to a PBCH configuration, the PBCH configuration based at least in part on the LBT mode of the base station.

Another apparatus for wireless communications is described. The apparatus may include a processor, memory in electronic communication with the processor, and instructions stored in the memory. The instructions may be operable to cause the processor to identify, at a base station, an LBT mode of the base station, to transmit, over a shared radio frequency spectrum band, a transmission comprising an indication of the LBT mode of the base station, and to transmit a PBCH transmission according to a PBCH configuration, the PBCH configuration based at least in part on the LBT mode of the base station.

A non-transitory computer-readable medium for wireless communications is described. The non-transitory computer-readable medium may include instructions operable to cause a processor to identify, at a base station, an LBT mode of the base station, to transmit, over a shared radio frequency spectrum band, a transmission comprising an indication of the LBT mode of the base station, and to transmit a PBCH transmission according to a PBCH configuration, the PBCH configuration based at least in part on the LBT mode of the base station.

Some examples of the method, apparatus, and non-transitory computer-readable medium described above may further include processes, features, means, or instructions for transmitting a synchronization signal block according to a synchronization signal block periodicity, the synchronization signal block periodicity based at least in part on the LBT mode of the base station.

Some examples of the method, apparatus, and non-transitory computer-readable medium described above may further include processes, features, means, or instructions for transmitting, on an anchor frequency, one or more transmissions according to a transmission periodicity, the transmission periodicity based at least in part on the LBT mode of the base station.

Some examples of the method, apparatus, and non-transitory computer-readable medium described above may further include processes, features, means, or instructions for performing an LBT mode switch comprising changing from the LBT mode of the base station to a second LBT mode of the base station. In some examples of the method, apparatus, and non-transitory computer-readable medium described above, performing the LBT mode switch comprises transmitting a paging message to a UE, the paging message indicating the LBT mode switch.

In some examples of the method, apparatus, and non-transitory computer-readable medium described above, performing the LBT mode switch may be based at least in part on an LBT mode configuration period. Some examples of the method, apparatus, and non-transitory computer-readable medium described above may further include processes, features, means, or instructions for transmitting a message indicating the LBT mode configuration period.

In some examples of the method, apparatus, and non-transitory computer-readable medium described above, performing the LBT mode switch may be based at least in part on a channel congestion threshold associated with the shared radio frequency spectrum band.

In some examples of the method, apparatus, and non-transitory computer-readable medium described above, the PBCH transmission comprises subframe timing information, frame timing information, a frequency hopping bandwidth, a number of hopping frequencies, a location of system information, a frame structure for a data channel, or any combination thereof.

In some examples of the method, apparatus, and non-transitory computer-readable medium described above, the transmission further comprises a synchronization signal. In some examples of the method, apparatus, and non-transitory computer-readable medium described above, the PBCH transmission may be transmitted in a number of subframes following the synchronization signal, wherein the number of subframes may be based at least in part on the LBT mode of the base station. In some examples of the method, apparatus, and non-transitory computer-readable medium described above, the synchronization signal comprises a cell identifier, the cell identifier comprising the indication of the LBT mode of the base station.

DETAILED DESCRIPTION

Figure 1:
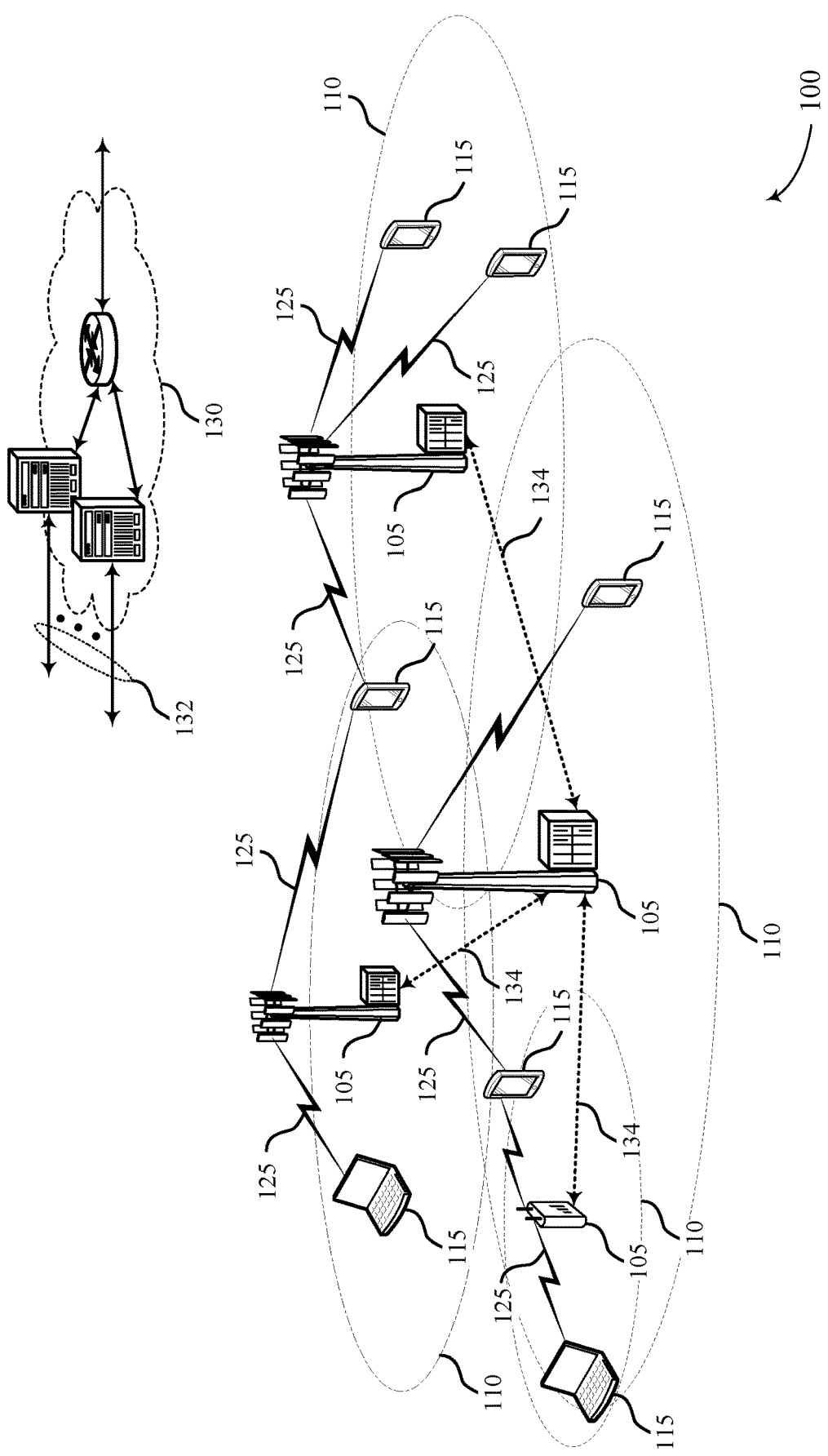
FIGS. 1 and 2 illustrate examples of wireless communications systems that support system acquisition in a shared radio frequency spectrum band in accordance with aspects of the present disclosure.

The described techniques relate to improved methods, systems, devices, or apparatuses that support system acquisition in a shared radio frequency spectrum band, such as an unlicensed radio frequency spectrum band. As indicated above, in some cases, unlicensed radio frequency spectrum bands may be used for Long Term Evolution (LTE), LTE-Advanced (LTE-A), or new radio (NR) communications. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner and may be accessed through contention-based access procedures. For example, contention-based access procedures may include limiting a duty cycle or a transmission time for a base station operating in the shared radio frequency spectrum, or performing a listen before talk (LBT) procedure to gain access to the shared radio frequency spectrum. The terms unlicensed radio frequency spectrum and shared radio frequency spectrum are used interchangeably herein.

In some wireless systems, such as Internet of Things (IoT) systems operating in shared radio frequency bands, base stations may operate in different LBT modes. For example, base stations may operate in an LBT enabled mode or in a non-LBT enabled mode. In some cases, a base station may always operate in one of the LBT modes, and may not operate in the other LBT mode. In other cases, the base station may operate in either of the LBT modes, and may adaptively switch between the two LBT modes (e.g., based on a measured or predicted level of traffic interference, an amount of data to transmit, etc.).

A user equipment (UE) may perform system acquisition with a base station in order to transmit and receive data over the share radio frequency spectrum. In some cases, to perform system acquisition, the UE may receive acquisition signals from the base station, and may determine information about the data channels to transmit or receive on based on the acquisition signals. The base station may transmit these acquisition signals one or more times over a same frequency band, which may be referred to as a designated anchor. The acquisition signals may include synchronization signals—such as primary synchronization signals (PSSs), secondary synchronization signals (SSSs), transmission detection signals (TDSs), or some combination of these contained within a synchronization signal block—and physical broadcast channel (PBCH) signals. The base station may include an indication of the LBT mode used by the base station in the acquisition signals (e.g., in the synchronization signals).

The UE may receive the synchronization signals, and may determine a PBCH configuration based on the LBT mode indication. For example, the PBCH configuration may include parameters related to the periodicity of synchronization signals, the periodicity of transmissions on the designated anchor, the number of subframes in the transmissions containing certain types of signals, or some combination of these parameters. One or more of these parameters may depend on the LBT mode of the base station. The UE may receive the PBCH signals from the base station based on the determined PBCH configuration. The UE may determine data channel information (e.g., a master information block (MIB)) based on the PBCH signals. In some cases, the UE may combine information from multiple subframes or transmissions of PBCH signals in order to successfully decode the data channel information.

In some cases, a base station may semi-statically or dynamically switch LBT modes after a UE has performed system acquisition. In one implementation, the base station may transmit a paging message to the UE to indicate the switch, and the UE may re-synchronize with the base station based on the paging message. In another implementation, the base station may perform the switch based on an LBT mode configuration period. The UE may automatically perform a re-synchronization process when attempting to access the base station following the LBT mode configuration period. In some cases, the UE may disconnect from the base station during the LBT mode switch. In other cases, the UE may remain connected, and may adaptively modify the expected PBCH configuration based on the LBT mode switch.

Aspects of the disclosure are initially described in the context of wireless communications systems. Further aspects of the disclosure are described with regards to transmission schedules and a process flow. Aspects of the disclosure are further illustrated by and described with reference to apparatus diagrams, system diagrams, and flowcharts that relate to system acquisition in a shared radio frequency spectrum.

FIG. 1 illustrates an example of a wireless communications system 100 that supports system acquisition in a shared radio frequency spectrum in accordance with aspects of the present disclosure. The wireless communications system 100 includes base stations 105, UEs 115, and a core network 130. In some examples, the wireless communications system 100 may be an LTE, LTE-A, or NR network. In some cases, wireless communications system 100 may support enhanced broadband communications, ultra-reliable (i.e., mission critical) communications, low latency communications, and communications with low-cost and low-complexity devices. In some cases, wireless communications system 100 may be an example of an IoT system for shared radio frequency spectrum. In shared radio frequency spectrum systems, base stations 105 may transmit acquisition signals over a shared spectrum to UEs 115. The acquisition signals may be based on an LBT mode of the transmitting base station 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115) where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames with lengths of 10 milliseconds (ms) ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (i.e., the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both frequency division duplexing (FDD) and time division duplexing (TDD) CCs.

In some cases, wireless system 100 may utilize both licensed and unlicensed radio frequency spectrum bands. For example, wireless system 100 may employ LTE License Assisted Access (LTE-LAA) or LTE Unlicensed (LTE U)

radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some wireless systems 100, such as an IoT system operating in shared radio frequency bands, a base station 105 may operate in different LBT modes. For example, the base station 105 may operate in an LBT enabled mode (e.g., when the base station 105 performs LBT to gain access to the shared medium) or a non-LBT enabled mode (e.g., when the base station 105 does not perform LBT to gain access to the shared medium). In some cases, the base station 105 may implement different frame structures, synchronization channel designs, or both based on the LBT mode (e.g., due to unlicensed spectrum regulations). Additionally, in some cases, the base station 105 may semi-statically or dynamically switch between LBT modes. The base station may transmit acquisition signals, such as synchronization signals and PBCH signals, to a UE 115, and may include an indication of the LBT mode in the synchronization signals. A UE 115 may receive the synchronization signals, and may perform system acquisition based on the indicated LBT mode of the base station 105.

Figure 2:
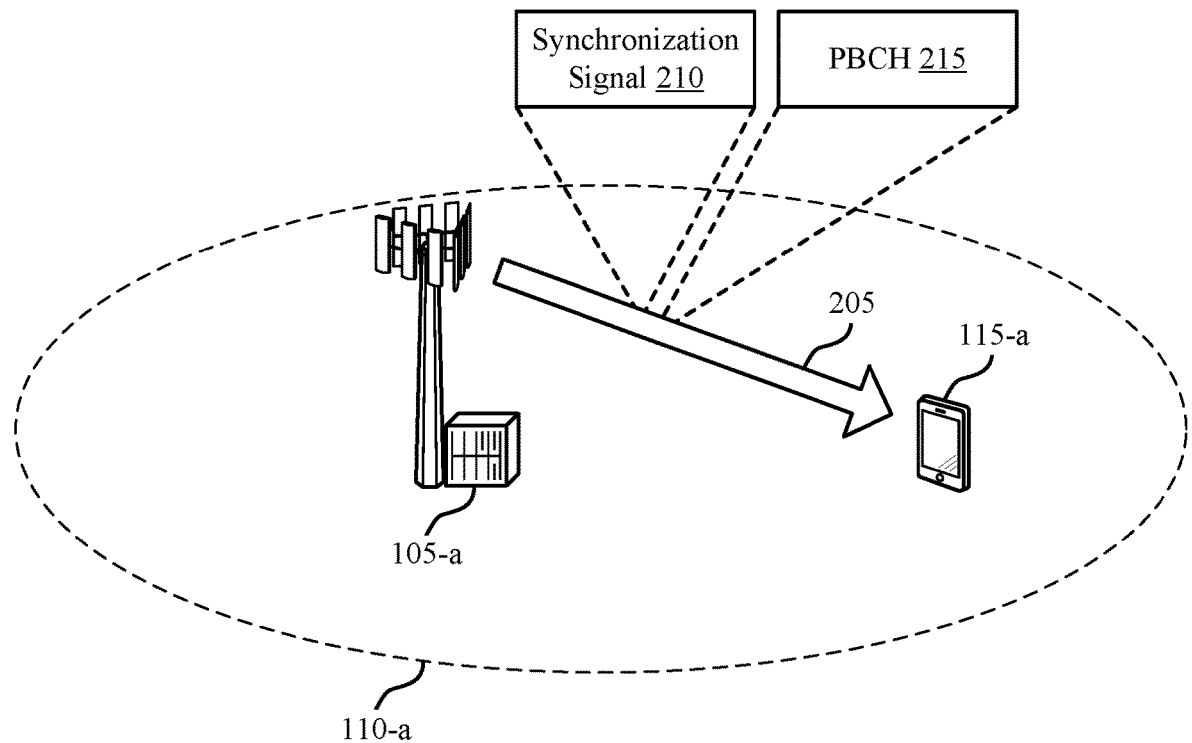

FIG. 2 illustrates an example of a wireless communications system 200 that supports system acquisition in a shared radio frequency spectrum in accordance with aspects of the present disclosure. The wireless communications system 200 may include base station 105-a and UE 115-a, which may be examples of a base station 105 and a UE 115, as described with reference to FIG. 1. Base station 105-a may provide communication coverage for geographic coverage area 110-a, which may be an example of a geographic coverage area 110. Base station 105-a may transmit signals, including synchronization signals 210 and PBCH signals 215, for system acquisition on the downlink 205 to UE 115-a. Base station 105-a may operate according to an LBT mode, such as a non-LBT enabled mode or an LBT enabled mode, as specified above. The wireless communications system 200 may be an example of an IoT system operating in the unlicensed radio frequency spectrum. In some cases, such a system may be referred to as an IoT for unlicensed spectrum (IoT-U) system, a MulteFire IoT system, or some similar or equivalent term.

In some implementations, base station 105-a may operate in a non-LBT enabled mode. In such a mode, base station 105-a may select a duty cycle based on certain regulations. For example, base station 105-a may select a 10% duty cycle to meet non-adaptive frequency hopping (non-AFH) transmission requirements for the European Union (EU). To maintain a 10% duty cycle, base station 105-a may schedule nine uplink or empty TTIs (e.g., subframes) for every one downlink 205 TTI (e.g., subframe). Alternatively, base station 105-a may select a different duty cycle (e.g., 5%, 20%, etc.), and may schedule downlink 205 and uplink/empty subframes accordingly. In some cases, base station 105-a may schedule subframes based on other regulations or requirements. For example, base station 105-a may have a maximum "on" time for downlink 205 transmission, after which base station 105-a may have a minimum "off" time during which base station 105-a may not transmit. In one example, the maximum "on" time may be 5 ms, followed by a minimum "off" time of 5 ms.

In other implementations, base station 105-a may operate in an LBT enabled mode. In such a mode, base station 105-a may select an anchor channel or anchor frequency for transmission. Base station 105-a may perform LBT on the anchor channel, and may transmit synchronization signals 210 (e.g., PSSs, SSSs, TDSs, or some combination of these contained in a synchronization signal block) and PBCH signals 215 on the anchor channel. After a downlink 205 transmission on the anchor channel—which may include one or more subframes of synchronization signals 210, PBCH signals 215, or a combination of the two—base station 105-a may frequency hop to a different frequency, which may be referred to as a hop frequency, to transmit or receive data. For example, base station 105-a may frequency hop to a different channel for a pre-determined amount of time (e.g., 80 ms) before performing a frequency hop back to the anchor channel. In some cases, base station 105-a may frequency hop back to the anchor channel after transmitting/receiving on a certain number of hop frequencies. For example, base station 105-a may frequency hop back to the anchor channel after transmitting/receiving on a single hop frequency or multiple hop frequencies (e.g., after every two hop frequencies, three hop frequencies, etc.).

A transmission on the anchor channel may include a full set of synchronization signals 210 (e.g., a PSS and an SSS) or a shortened set of synchronization signals 210 (e.g., a TDS) for base station 105-a transmission detection. UE 115-a receiving the transmission may perform one shot detection based on receiving the PSS and the SSS in a downlink 205 transmission. That is, UE 115-a may determine timing and cell identity for base station 105-a based on the single transmission of PSS and SSS on the anchor channel. Once UE 115-a has determined the timing and the cell identity for base station 105-a, UE 115-a may detect further base station 105-a transmissions based on a TDS, which may be shorter than a full set of synchronization signals 210. The TDS in a transmission may be an example of a PSS, a portion of a PSS, or some other signal that includes information for UE 115-a to identify the associated base station 105-a for that transmission. In some cases, the TDS may be referred to as, or may be an example of, a channel usage beacon signal (CUBS).

The downlink 205 transmission on the anchor channel may additionally include one or more PBCH signals 215. In some cases, a transmission including a full set of synchronization signals 210 may include fewer PBCH subframes than a transmission including a shortened set of synchronization signals 210. A UE 115, such as UE 115-a, receiving the transmission may use information from one or more of the PBCH subframes in one or more downlink 205 transmissions on the anchor channel to decode a MIB. UE 115-a may determine a downlink bandwidth, a set of bits associated with a system frame number, a physical HARQ indicator channel (PHICH), or some combination of these parameters based on decoding the MIB. Additionally or alternatively, UE 115-a may determine subframe or frame timing, frequency hopping bandwidth, a number of hopping frequencies, a location of system information, a frame structure for one or more data channels, or any combination of these parameters based on the PBCH signals 215. In some cases, UE 115-a may successfully decode the PBCH signals 215 in a first transmission for which UE 115-a successfully performs one shot detection. In other cases, UE 115-a may receive one or more further transmissions on the anchor channel in order to successfully decode the PBCH signals 215. In these cases, UE 115-a may identify that the further transmissions are associated with the first transmission based on the TDSs for the further transmissions.

One specific example may involve a first base station 105 operating in a non-LBT enabled mode and a second base station 105 operating in an LBT enabled mode. The first base station 105 may transmit synchronization signals 210 (e.g., a PSS and an SSS) in two out of seven downlink frames, resulting in a 28% overhead for synchronization signals 210 on the downlink 205. If the first base station 105 transmits synchronization signals 210 once every four downlink 205 transmissions on the designated anchor channel, the first base station 105 may transmit synchronization signals 210 once every 280 ms. The first base station 105 may transmit PBCH signals 215 in the other downlink 205 transmissions on the designated anchor channel, resulting in six subframes of PBCH signals 215 every 280 ms. In a theoretical worst case coverage scenario, successfully decoding the PBCH signals 215 would involve a UE 115 receiving fourteen PBCH subframes following PSS/SSS detection, which may mean that the UE 115 may take up to 700 ms to successfully perform cell acquisition following PSS/SSS detection in the non-LBT enabled mode.

Continuing the specific example, the second base station 105 may transmit five subframes per transmission on the anchor channel in the LBT enabled mode. For base station 105 transmission detection, the second base station 105 may transmit an additional signal (e.g., the TDS), which may be an example of a 1 ms transmission. If the second base station 105 transmits a PSS and SSS once every four downlink 205 transmissions on the anchor channel, then in a theoretical worst case coverage scenario, a UE 115 may use 350 ms for successful cell acquisition. In some cases, the base station 105 may transmit the PSS and SSS more frequently, which may improve acquisition time. If LBT has a 50% success rate on the anchor channel, receiving UEs 115 for the non-LBT enabled first base station 105 and the LBT enabled second base station 105 may have comparable cell acquisition times.

The wireless communications system 200 may implement a specific configuration for LBT mode operation. In a first case, all base stations 105 may operate using either a non-LBT enabled mode or an LBT enabled mode. In a second case, a first set of base stations 105 may operate using a non-LBT enabled mode, while a second set of base stations 105 may operate using an LBT enabled mode. In a third case, base stations 105 may switch between operating using a non-LBT enabled mode and operating using an LBT enabled mode.

If base stations 105 may operate using different LBT modes, a UE 115 may determine which LBT mode a base station 105 is using. In some cases, base station 105-a may include information indicating the current LBT mode of base station 105-a in a synchronization signal 210. In some examples, different PSS or SSS sequences—or portions of PSS or SSS sequences—may indicate either LBT enabled mode or non-LBT enabled mode. Additionally or alternatively, the PSS, SSS, or a combination of the two may indicate a next occurrence of PSS/SSS transmitted by base station 105-a. For example, the PSS, SSS, or the combination of the two may indicate a frequency of PSS/SSS, a periodicity of PSS/SSS, or a time corresponding to the next transmission of PSS/SSS. In one such example, base station 105-a may include two bits to indicate one of four different periodicities of PSS/SSS. UE 115-a may receive the synchronization signal 210 (e.g., PSS and SSS using one shot detection) and may determine a PBCH configuration based on the indicated LBT mode. Among other things, UE 115-a may determine whether base station 105-a transmits the PBCH signals 215 on the anchor channel or on a data channel (e.g., corresponding to a hop frequency) based on the PBCH configuration.

The PBCH configuration may include multiple parameters that are different depending on the LBT mode. For example, a periodicity of the PSS/SSS or a periodicity of downlink 205 transmissions on the anchor channel may depend on the LBT mode. Additionally or alternatively, the number of subframes in a transmission, the number of PSS/SSS subframes, the number of PBCH subframes, or any combination of these numbers may depend on the LBT mode. In certain cases, other information associated with system acquisition may be different depending on the LBT mode of base station 105-a.

In some cases, base station 105-a may semi-statically or dynamically switch between LBT modes. For example, base station 105-a may determine to switch to non-LBT enabled mode based on a level of congestion or traffic interference on the shared medium exceeding a certain threshold level of congestion or interference. Similarly, base station 105-a may determine to switch to LBT enabled mode based on an amount of data to transmit exceeding a certain threshold size of data.

Base station 105-a may indicate this switch to a UE 115, such as UE 115-a that has previously performed system acquisition. For example, UE 115-a may be in an RRC idle mode. Base station 105-a may transmit a message to UE 115-a indicating the switch. The message may be, for example, a paging message, and may be similar or identical in form to paging messages used to alert UE 115-a of a new call or user data. The cell identifier associated with base station 105-a may not change based on this switch. Instead, the message may include an indication of the new LBT mode, or an indication of a new frame structure or broadcast structure based on the new LBT mode. UE 115-a may wake up from RRC idle mode, and may check the physical downlink shared channel (PDSCH) for the message. Based on the message, UE 115-a may disconnect from the system, and may perform a re-synchronization process. The re-synchronization process may include UE 115-a determining the new LBT mode and the new PBCH configuration.

Alternatively, base station 105-a and UE 115-a may have a pre-determined periodicity for re-synchronization. Base station 105-a may perform LBT mode switching based on this periodicity, and UE 115-a may correspondingly perform re-synchronization based on the periodicity. For example, base station 105-a may determine whether to perform an LBT mode switch at a set interval (e.g., every hour). If UE 115-a performs access following this set interval, UE 115-a may automatically perform a re-synchronization process. In the re-synchronization process, UE 115-a may determine whether or not base station 105-a switched LBT modes.

In some cases, UE 115-a may be in an RRC connected mode with base station 105-a prior to the LBT mode switch. UE 115-a may disconnect (e.g., based on a signal received from base station 105-a) from base station 105-a before base station 105-a performs the LBT mode switch. Alternatively, base station 105-a may indicate the LBT mode switch in an RRC configuration to UE 115-a. In this case, UE 115-a may or may not remain connected to base station 105-a during the LBT mode switch.

In certain implementations, base station 105-a may implement a different physical signal (e.g., independent of a PSS, SSS, or TDS) to indicate the LBT mode or PBCH configuration of base station 105-*a*. Base station 105-*a* may transmit this physical signal on the same or a different physical channel than the synchronization signal 210. UE 115-*a* may receive the physical signal, and may determine the LBT mode and PBCH configuration based on information in the signal. In some cases, UE 115-*a* may receive the PBCH signals 215 and determine the MIB based on the synchronization signal 210, the different physical signal, or some combination of these signals.

Figure 3:
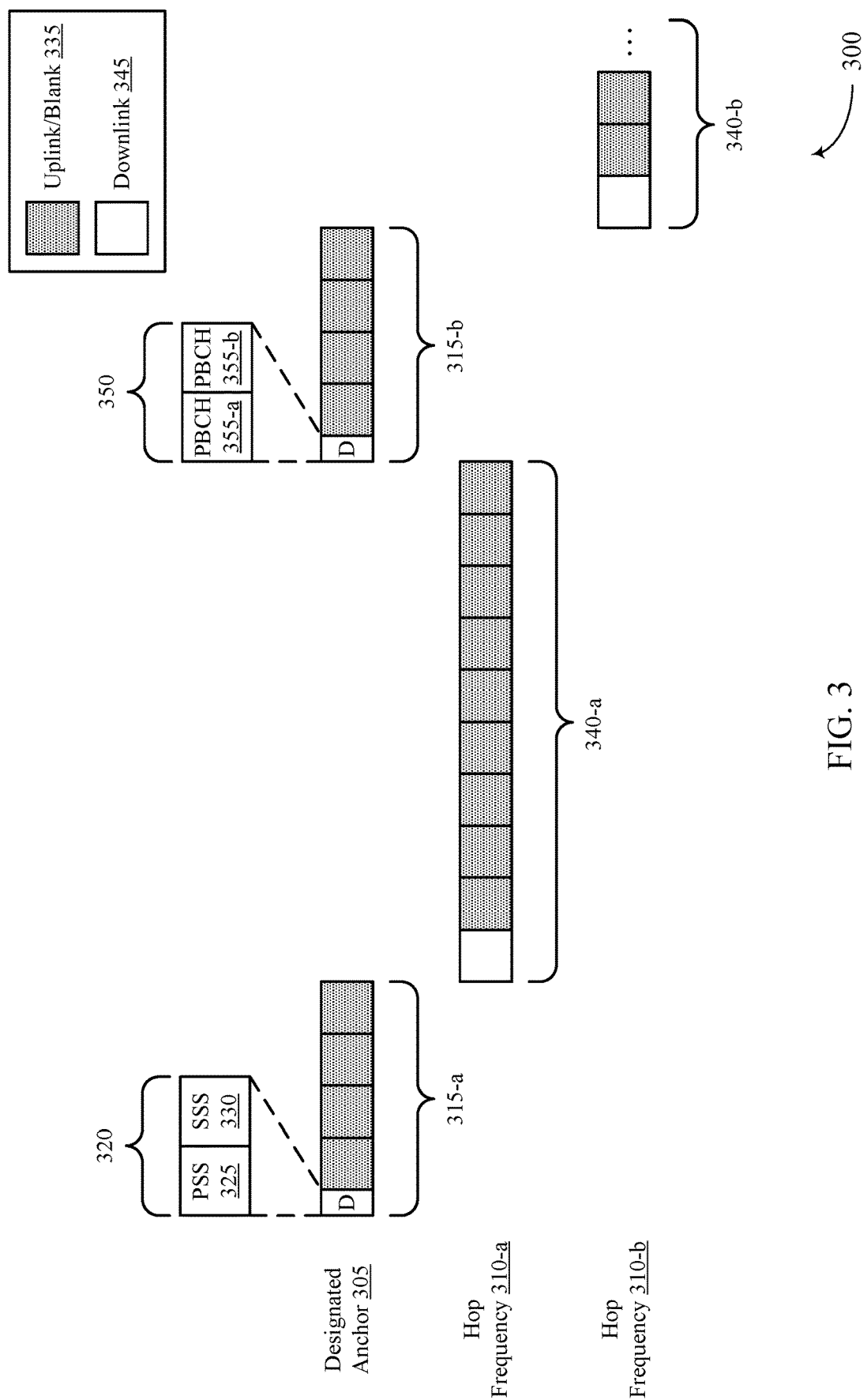
FIG. 3 illustrates an example of a non-listen before talk (LBT) enabled transmission schedule that supports system acquisition in a shared radio frequency spectrum band in accordance with aspects of the present disclosure.

FIG. 3 illustrates an example of a non-LBT enabled transmission schedule 300 that supports system acquisition in a shared radio frequency spectrum in accordance with aspects of the present disclosure. The non-LBT enabled transmission schedule 300 may include the scheduling of uplink or empty subframes 335 and downlink subframes 345 on multiple carriers. In some cases, the non-LBT enabled transmission schedule 300 may support a duty cycle of 10%. A base station 105, as described with respect to FIGS. 1 and 2, may transmit and receive based on the non-LBT enabled transmission schedule 300.

In the non-LBT enabled transmission schedule 300, a base station 105 in non-LBT enabled mode may transmit on a designated anchor 305, which may also be referred to as an anchor channel or anchor carrier. The base station 105 may schedule downlink transmissions 345 and uplink transmissions 335 within each anchor transmission 315. In a first anchor transmission 315-*a,* the base station 105 may transmit synchronization signals 320 in the scheduled downlink portion. In some cases, the synchronization signals 320 may include a PSS 325 and an SSS 330. The base station 105 may schedule one or more subframes for uplink transmission 335 following the synchronization signals 320 (e.g., to meet a certain duty cycle requirement). In some cases, a UE 115 may transmit to the base station 105 during the uplink subframes 335, while in other cases there may be no transmissions during these subframes (i.e., the subframes are blank subframes 335).

Following an anchor transmission 315, the base station 105 may frequency hop to a first hop frequency 310 (e.g., hop frequency 310-*a*) and may perform a data channel transmission 340 on the hop frequency 310. The data channel transmission 340 may include one or more downlink subframes 345 and one or more uplink/blank subframes 335. For example, data channel transmission 340-*a* may include one downlink subframe 345 and nine uplink/blank subframes 335, for a 10% duty cycle.

Following a data channel transmission 340, the base station 105 may frequency hop back to the designated anchor 305. In some cases, the base station 105 may perform multiple data channel transmissions 340 on multiple hop frequencies 310 before returning to the designated anchor 305. The base station 105 may transmit a next anchor transmission 315, such as anchor transmission 315-*b,* on the designated anchor 305. In a scheduled downlink period 345 of anchor transmission 315-*b,* the base station 105 may transmit PBCH signals 350. For example, the base station 105 may transmit PBCH subframe 355-*a* and PBCH subframe 355-*b.* The base station 105 may again schedule one or more uplink/blank subframes 335 in anchor transmission 315-*b* (e.g., to meet a duty cycle requirement for the shared medium). The base station 105 may then frequency hop to a second hop frequency 310-*b,* and may transmit and/or receive during data channel transmission 340-*b.* In some cases, hop frequencies 310-*a* and 310-*b* may include the same frequencies. In other cases, hop frequencies 310-*a* and 310-*b* may be disjoint frequency bands. Further anchor transmissions 315 on the designated anchor 305 may include additional PBCH subframes 355, or may include repeated PSSs 325 or SSSs 330 in case a receiving UE 115 failed to perform one shot detection.

A UE 115 may receive the synchronization signals 320, and may determine that the base station 105 is implementing a non-LBT enabled mode. The UE 115 may also determine a PBCH configuration for the base station 105. In some cases, the UE 115 may receive the PBCH signals 350 based on the determined PBCH configuration. Based on decoding the PBCH signals 350, the UE 115 may determine the hop frequencies 310 to transmit and receive on with the base station 105.

In an alternative embodiment to the one illustrated, the non-LBT enabled transmission schedule 300 may include the base station 105 transmitting a data channel transmission 340 first (e.g., data channel transmission 340-*a*) followed by a first anchor transmission 315 (e.g., anchor transmission 315-*a*). The transmission format implemented by the base station 105, with regard to the anchor transmissions 315 and data channel transmissions 340, may be indicated by the PBCH signals 350. Another alternative embodiment may include different numbers of subframes scheduled for synchronization signals 320, PBCH signals 350, or both in the anchor transmissions 315. For example, including three subframes of PSS 325, SSS 330, or PBCH 355 in each anchor transmission 315 may allow a UE 115 to perform system acquisition faster—but may result in a higher synchronization overhead—than a format with two subframes of each.

Figure 4:
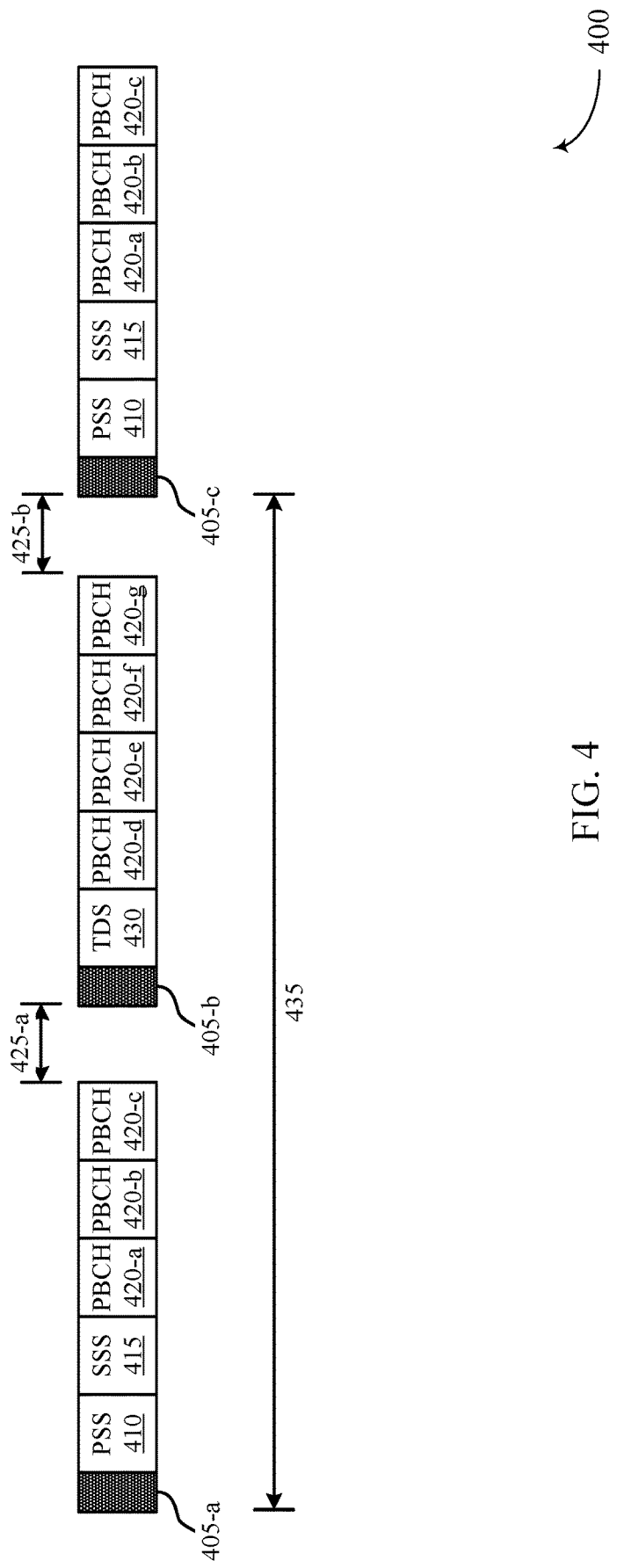
FIG. 4 illustrates an example of an LBT enabled transmission schedule that supports system acquisition in a shared radio frequency spectrum band in accordance with aspects of the present disclosure.

FIG. 4 illustrates an example of an LBT enabled transmission schedule 400 that supports system acquisition in a shared radio frequency spectrum in accordance with aspects of the present disclosure. The LBT enabled transmission schedule 400, as illustrated, may show scheduled transmissions on a designated anchor (i.e., an anchor channel or anchor carrier). A base station 105, as described with respect to FIGS. 1 and 2, may transmit signals for system acquisition to a UE 115 based on the LBT enabled transmission schedule 400.

The base station 105 may perform an LBT process 405-*a*. If the base station 105 gains access to the shared medium (e.g., the base station 105 may not detect any transmissions over the anchor channel), the base station 105 may transmit acquisition information to a UE 115. For example, the base station 105 may transmit one or more synchronization signals and one or more PBCH signals 420. In some cases, the transmissions following the LBT processes 405 may span a set number of subframes (e.g., five subframes) or a set amount of time (e.g., 5 ms). In a first transmission, the base station 105 may transmit a PSS 410, an SSS 415, and three PBCH signals 420-*a,* 420-*b,* and 420-*c.* A UE 115 may receive the transmission, and may determine a cell identity and timing associated with the base station 105 based on the PSS 410 and SSS 415. The UE 115 may attempt to decode the PBCH based on the received PBCH signals 420. If the UE 115 does not decode the PBCH, the UE 115 may listen for a next transmission of acquisition information on the anchor channel.

In some cases, following the transmission on the anchor carrier, the base station 105 may frequency hop to a different hop frequency, and may transmit downlink signals or receive uplink signals. A gap 425 may represent the time spent transmitting/receiving on a hop frequency. For example, gap 425-*a* may span 80 ms for the base station 105.

Following gap 425-*a,* the base station 105 may perform another LBT procedure 405-*b* to once again transmit on the anchor channel. If the base station 105 gains access to the medium, the base station 105 may transmit a TDS 430. The TDS 430 may be a shorter transmission than transmitting the PSS 410 and SSS 415. The UE 115 may receive the TDS 430, and may determine that the transmission including the TDS 430 is associated with the same base station 105 as the transmission including the PSS 410 and SSS 415. For example, the TDS 430 may include an indication of the PSS 410, SSS 415, base station 105, or some combination of these. The base station 105 may transmit multiple PBCH signals 420 (e.g., PBCH signals 420-d, 420-e, 420-f, and 420-g) following the TDS 430. The UE 115 may receive the PBCH signals 420, and may attempt to decode the PBCH based on the PBCH signals 420. In some cases, the UE 115 may use information from multiple PBCH signals 420 (e.g., PBCH signals 420-d and 420-e) to decode the PBCH. Additionally or alternatively, the UE 115 may use PBCH signals 420 from multiple transmissions (e.g., PBCH signals 420-a and 420-d) to decode the PBCH.

Following the second transmission on the anchor channel, the base station 105 may frequency hop to a hopping frequency for downlink or uplink transmission. The base station 105 may frequency hop during gap 425-b, which may be the same length of time as gap 425-a. In some cases, the base station 105 may transmit more transmissions including a TDS 430 on the anchor channel following gap 425-b. In other cases, the base station 105 may transmit acquisition signals according to a synchronization transmission period 435. The synchronization transmission period 435 may be based on a number of frequency hops (e.g., in this case, two frequency hops). Following the synchronization transmission period 435, the base station 105 may perform another LBT procedure 405-c. After gaining access to the medium, the base station 105 may repeat the transmission of the PSS 410 and SSS 415 on the anchor channel, followed by repeating the transmission of PBCH signals 420-a, 420-b, and 420-c. If the UE 115 failed to successfully perform system acquisition based on the first synchronization transmission period 435, the UE 115 may attempt to perform system acquisition based on the repeated transmission of acquisition signals.

Figure 5:
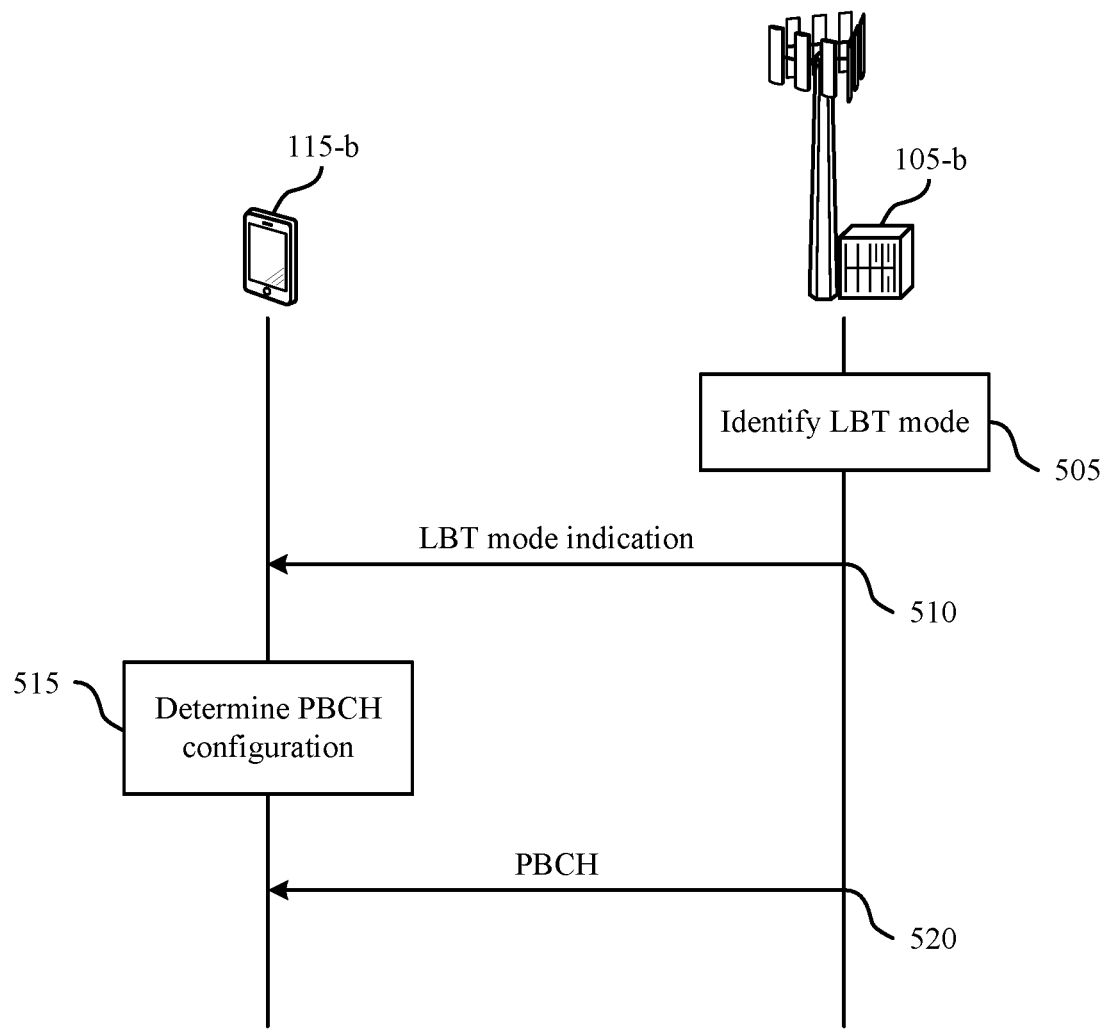
FIG. 5 illustrates an example of a process flow that supports system acquisition in a shared radio frequency spectrum band in accordance with aspects of the present disclosure.

FIG. 5 illustrates an example of a process flow 500 for system acquisition in a shared radio frequency spectrum in accordance with aspects of the present disclosure. Process flow 500 may include base station 105-b and UE 115-b, which may be examples of a base station 105 and a UE 115 as described herein with reference to FIGS. 1 and 2.

At 505, base station 105-b may identify an LBT mode. For example, base station 105-b may operate in an LBT enabled or non-LBT enabled mode.

At 510, base station 105-b may transmit, over a shared radio frequency spectrum band, an indication of the LBT mode to UE 115-b. In some cases, the transmission from base station 105-b may be an example of a synchronization signal. The synchronization signal may include a cell identifier, which may contain the indication of the LBT mode.

At 515, UE 115-b may determine a PBCH configuration based on the LBT mode of base station 105-b. In some cases, this may include determining a periodicity of a synchronization signal block, determining a periodicity of transmissions from base station 105-b on an anchor frequency, determining a number of subframes that follow a synchronization signal transmission, or some combination of these determinations. These determinations may be based on the LBT mode of base station 105-b. For example, the PBCH may be configured as illustrated in the non-LBT enabled transmission schedule 300 of FIG. 3, or may be configured as illustrated in the LBT enabled transmission schedule 400 as illustrated in FIG. 4. In a non-LBT enabled transmission schedule 300, base station 105-b may transmit PBCH signals in a separate transmission from the indication of the LBT mode. In contrast, in an LBT enabled transmission schedule 400, base station 105-b may transmit the PBCH signals in the same transmission as the indication of the LBT mode. UE 115-b may determine how to successfully receive the PBCH signals based on the determined PBCH configuration. In some cases, UE 115-b may additionally identify an LBT mode configuration period of base station 105-b (e.g., based on a transmission received from base station 105-b). Determining the PBCH configuration may be based on the LBT mode configuration period.

At 520, base station 105-b may transmit a PBCH transmission (e.g., according to a non-LBT enabled transmission schedule 300 or an LBT enabled transmission schedule 400), which UE 115-b may receive according to the determined PBCH configuration. The PBCH transmission may include subframe timing information, frame timing information, a frequency hopping bandwidth, a number of hopping frequencies, a location of system information, a frame structure for a data channel, or some combination of this information. In some cases, base station 105-b may transmit the PBCH transmission over one or more subframes following the transmission at 510 (e.g., the synchronization signal). UE 115-b may decode a MIB based on receiving the PBCH transmission. For example, UE 115-b may decode the MIB based on PBCH information received in multiple subframes.

Figure 6:
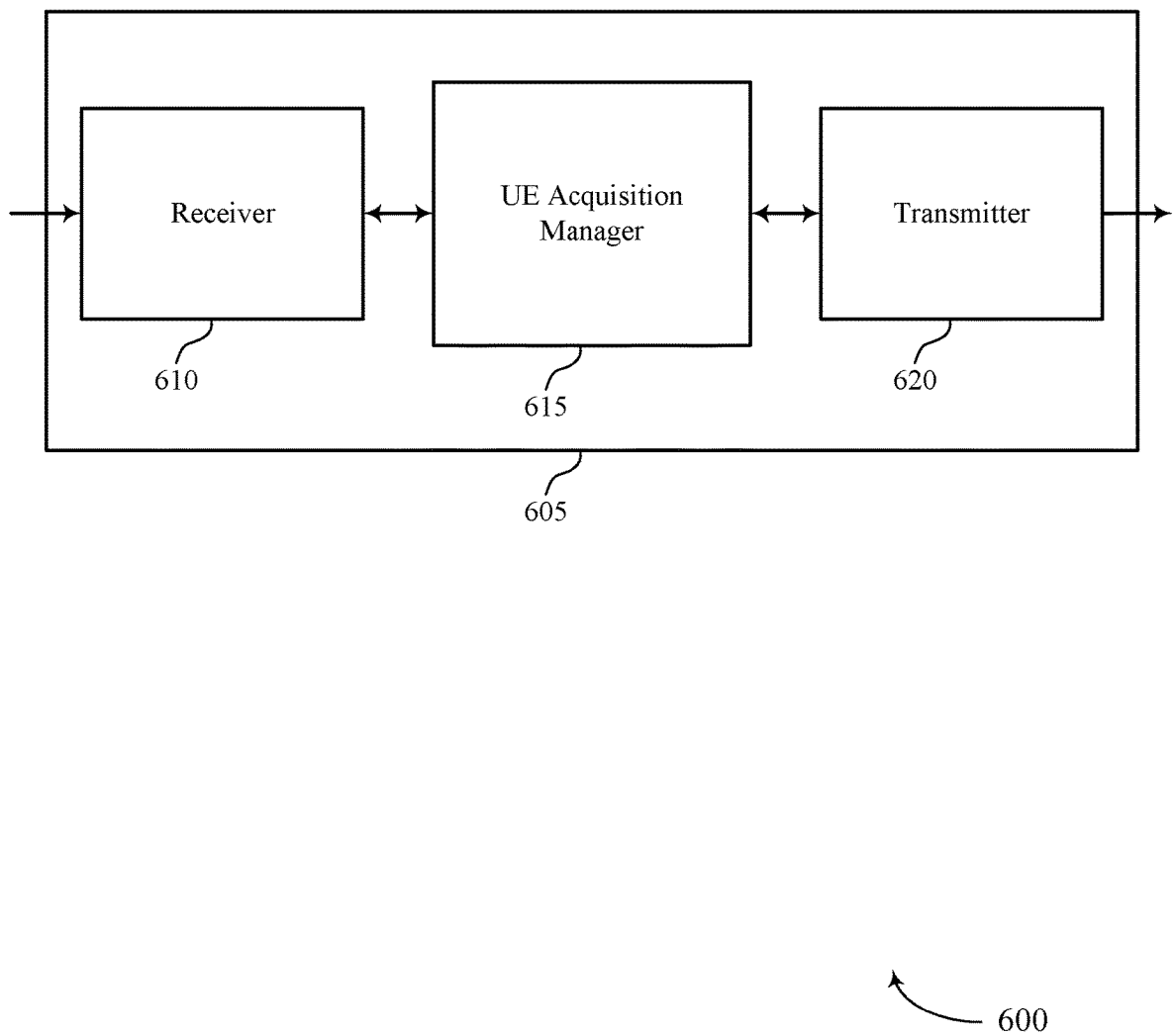
FIGS. 6 through 8 show block diagrams of a device that supports system acquisition in a shared radio frequency spectrum band in accordance with aspects of the present disclosure.

FIG. 6 shows a block diagram 600 of a wireless device 605 that supports system acquisition in a shared radio frequency spectrum in accordance with aspects of the present disclosure. Wireless device 605 may be an example of aspects of a UE 115 as described herein. Wireless device 605 may include receiver 610, UE acquisition manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to system acquisition in a shared radio frequency spectrum, etc.). Information may be passed on to other components of the device. The receiver 610 may be an example of aspects of a transceiver 935 described with reference to FIG. 9. The receiver 610 may utilize a single antenna or a set of antennas.

UE acquisition manager 615 may be an example of aspects of the UE acquisition manager 915 described with reference to FIG. 9. UE acquisition manager 615 and/or at least some of its various sub-components may be implemented in hardware, software executed by a processor, firmware, or any combination thereof If implemented in software executed by a processor, the functions of the UE acquisition manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE acquisition manager 615 and/or at least some of its various sub-components may be physically located at various positions, including being distributed such that portions of functions are implemented at different physical locations by one or more physical devices. In some examples, UE acquisition manager 615 and/or at least some of its various sub-components may be a separate and distinct component in accordance with various aspects of the present disclosure. In other examples, UE acquisition manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE acquisition manager 615 may receive, over a shared radio frequency spectrum band, a transmission from a base station including an indication of an LBT mode of the base station. The UE acquisition manager 615 may then determine, based on the indication of the LBT mode of the base station, a PBCH configuration of the base station, and receive a PBCH transmission according to the determined PBCH configuration.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
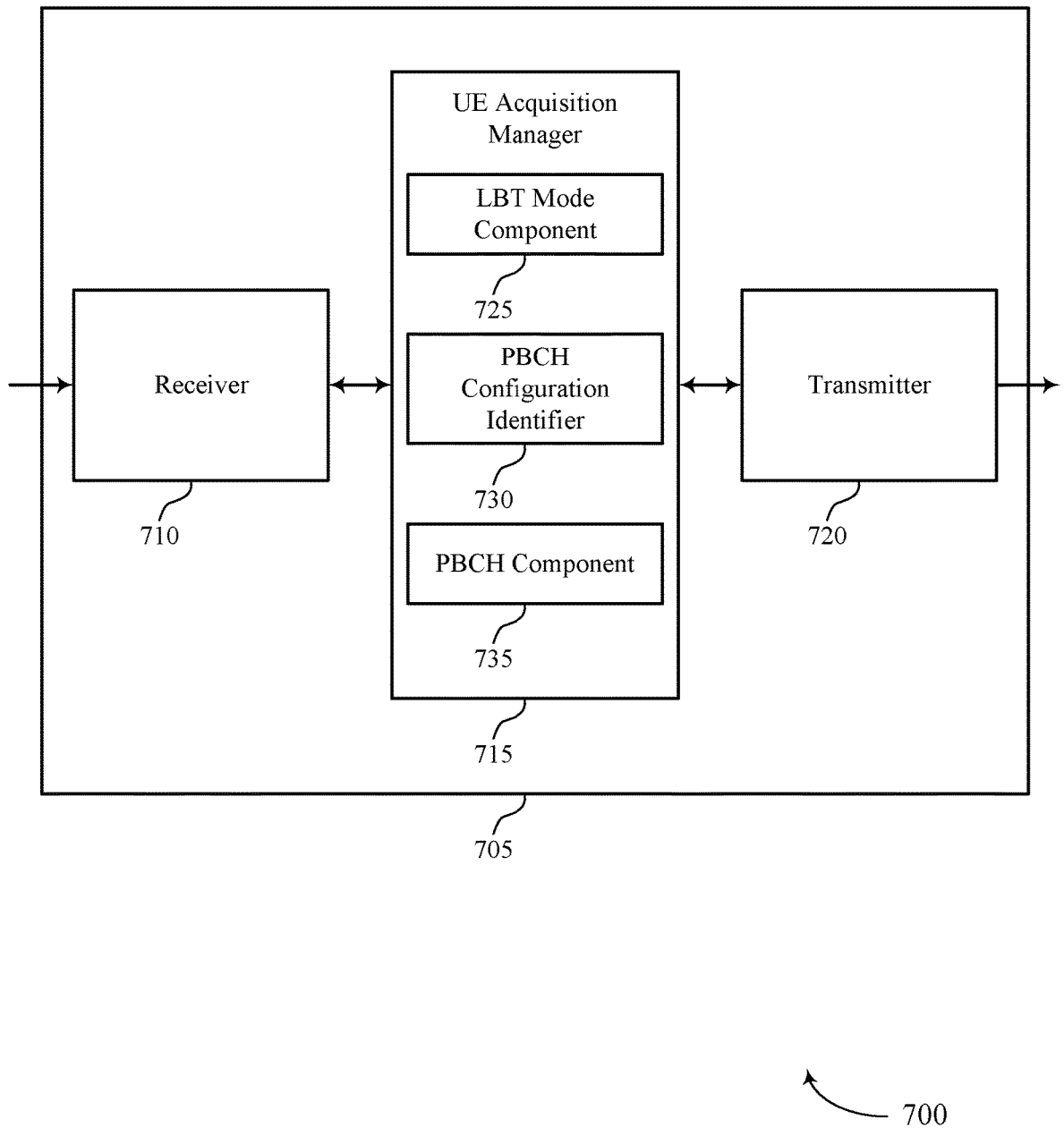

FIG. 7 shows a block diagram 700 of a wireless device 705 that supports system acquisition in a shared radio frequency spectrum in accordance with aspects of the present disclosure. Wireless device 705 may be an example of aspects of a wireless device 605 or a UE 115 as described with reference to FIGS. 1 through 6. Wireless device 705 may include receiver 710, UE acquisition manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, information related to system acquisition in a shared radio frequency spectrum, etc.). Information may be passed on to other components of the device. The receiver 710 may be an example of aspects of the transceiver 935 described with reference to FIG. 9. The receiver 710 may utilize a single antenna or a set of antennas.

UE acquisition manager 715 may be an example of aspects of the UE acquisition manager 915 described with reference to FIG. 9. UE acquisition manager 715 may also include LBT mode component 725, PBCH configuration identifier 730, and PBCH component 735.

LBT mode component 725 may receive, over a shared radio frequency spectrum band, a transmission from a base station including an indication of an LBT mode of the base station. In some cases, the transmission from the base station includes a synchronization signal. In some cases, the synchronization signal includes a cell identifier, the cell identifier including the indication of the LBT mode of the base station.

PBCH configuration identifier 730 may determine, based on the indication of the LBT mode of the base station, a PBCH configuration of the base station. In some cases, determining the PBCH configuration of the base station includes determining a periodicity of a synchronization signal block based on the LBT mode of the base station. In some cases, determining the PBCH configuration of the base station includes determining a periodicity of transmissions from the base station on an anchor frequency based on the LBT mode of the base station. In some cases, determining the PBCH configuration of the base station includes determining, based on the LBT mode of the base station, a number of subframes that follow a synchronization signal transmission.

PBCH component 735 may receive a PBCH transmission according to the determined PBCH configuration. Additionally, PBCH component 735 may receive a second PBCH transmission according to the determined PBCH configuration. In some cases, receiving the PBCH transmission includes receiving, based on the determined number of subframes, the PBCH transmission over one or more subframes following the synchronization signal transmission. In some cases, the PBCH transmission includes subframe timing information, frame timing information, a frequency hopping bandwidth, a number of hopping frequencies, a location of system information, a frame structure for a data channel, or any combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
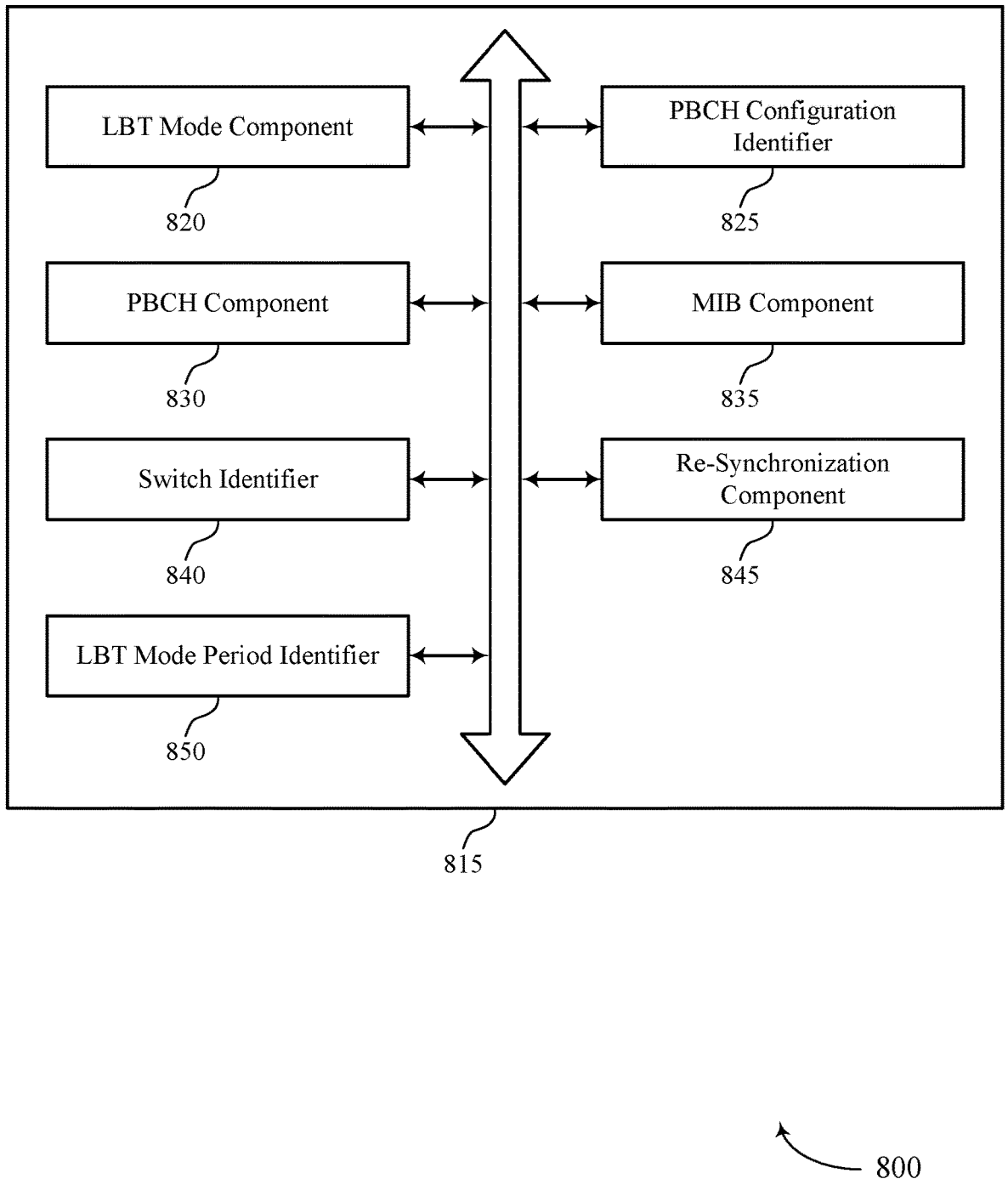

FIG. 8 shows a block diagram 800 of a UE acquisition manager 815 that supports system acquisition in a shared radio frequency spectrum in accordance with aspects of the present disclosure. The UE acquisition manager 815 may be an example of aspects of a UE acquisition manager 615, a UE acquisition manager 715, or a UE acquisition manager 915 described with reference to FIGS. 6, 7, and 9. The UE acquisition manager 815 may include LBT mode component 820, PBCH configuration identifier 825, PBCH component 830, MIB component 835, switch identifier 840, re-synchronization component 845, and LBT mode period identifier 850. Each of these modules may communicate, directly or indirectly, with one another (e.g., via one or more buses).

LBT mode component 820 may receive, over a shared radio frequency spectrum band, a transmission from a base station including an indication of an LBT mode of the base station. In some cases, the transmission from the base station includes a synchronization signal. In some cases, the synchronization signal includes a cell identifier, the cell identifier including the indication of the LBT mode of the base station.

PBCH configuration identifier 825 may determine, based on the indication of the LBT mode of the base station, a PBCH configuration of the base station. In some cases, determining the PBCH configuration of the base station includes determining a periodicity of a synchronization signal block based on the LBT mode of the base station. Additionally or alternatively, determining the PBCH configuration of the base station includes determining a periodicity of transmissions from the base station on an anchor frequency based on the LBT mode of the base station. Furthermore, additionally or alternatively, determining the PBCH configuration of the base station includes determining, based on the LBT mode of the base station, a number of subframes that follow a synchronization signal transmission.

PBCH component 830 may receive a PBCH transmission according to the determined PBCH configuration and, in some cases, may receive a second PBCH transmission according to the determined PBCH configuration. In some cases, receiving the PBCH transmission includes receiving, based on the determined number of subframes, the PBCH transmission over one or more subframes following the synchronization signal transmission. In some cases, the PBCH transmission includes subframe timing information, frame timing information, a frequency hopping bandwidth, a number of hopping frequencies, a location of system information, a frame structure for a data channel, or any combination thereof.

MIB component 835 may decode a MIB based on the PBCH transmission. In some cases, MIB component 835 may decode the MIB based on the PBCH transmission and the second PBCH transmission. Switch identifier 840 may receive a paging message from the base station, the paging message indicating a change in the LBT mode of the base station. Re-synchronization component 845 may perform a re-synchronization process with the base station based on receiving the paging message.

LBT mode period identifier 850 may identify an LBT mode configuration period of the base station, where determining the PBCH configuration of the base station is based on the identified LBT mode configuration period of the base station. In some cases, identifying the LBT mode configuration period of the base station includes receiving a message from the base station during the LBT mode configuration period.

Figure 9:
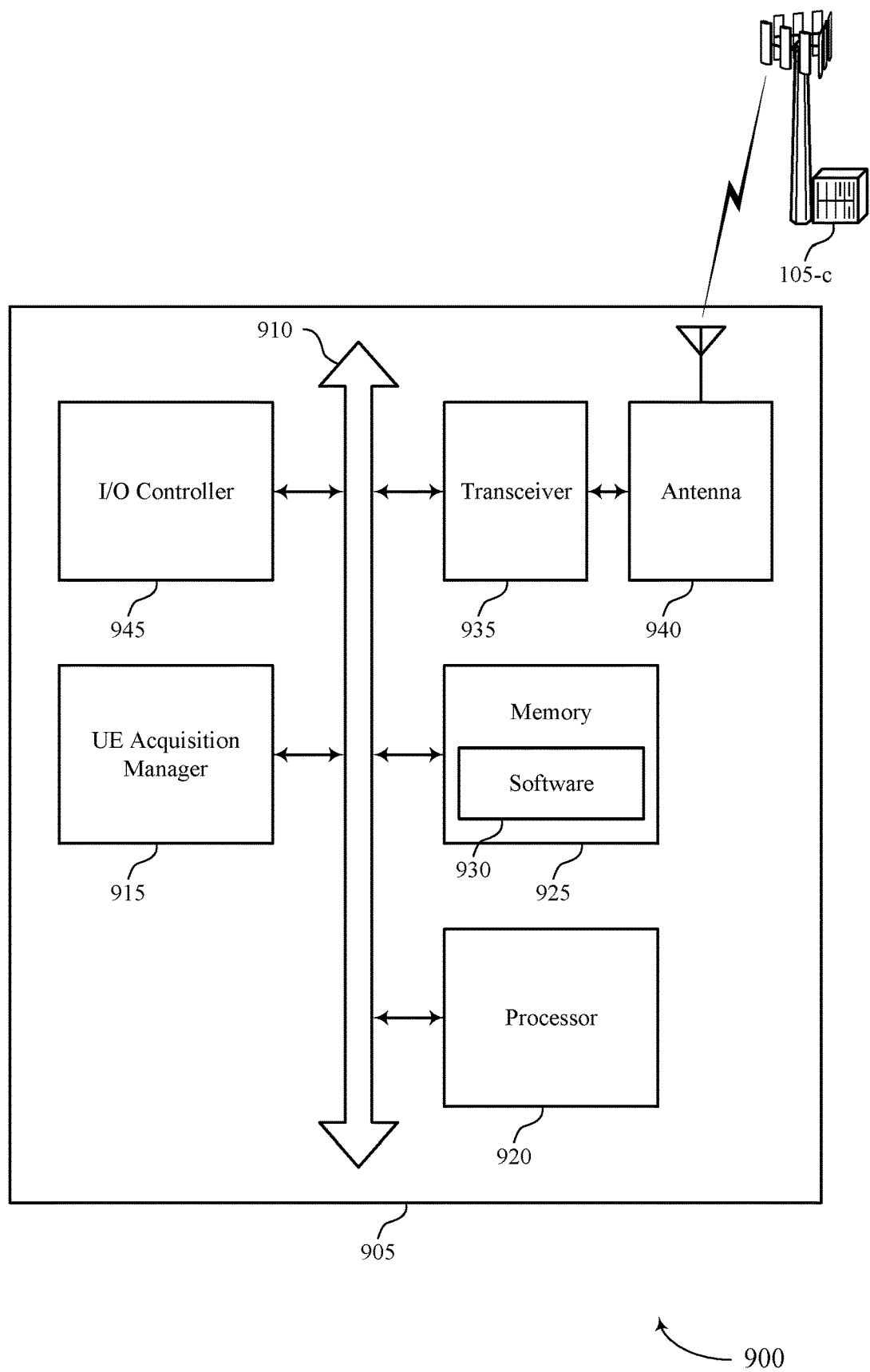
FIG. 9 illustrates a block diagram of a system including a user equipment (UE) that supports system acquisition in a shared radio frequency spectrum band in accordance with aspects of the present disclosure.

FIG. 9 shows a diagram of a system 900 including a device 905 that supports system acquisition in a shared radio frequency spectrum in accordance with aspects of the present disclosure. Device 905 may be an example of or include the components of a UE 115, wireless device 605, or wireless device 705, as described above, e.g., with reference to FIGS. 1 through 7. Device 905 may include components for bi-directional voice and data communications including components for transmitting and receiving communications, including UE acquisition manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105 (e.g., base station 105-*c*).

Processor 920 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting system acquisition in a shared radio frequency spectrum).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support system acquisition in a shared radio frequency spectrum. Software 930 may be stored in a non-transitory computer-readable medium such as system memory or other memory. In some cases, the software 930 may not be directly executable by the processor 920 but may cause a computer (e.g., when compiled and executed) to perform functions described herein.

Transceiver 935 may communicate bi-directionally, via one or more antennas 940, wired, or wireless links as described above. For example, the transceiver 935 may represent a wireless transceiver and may communicate bi-directionally with another wireless transceiver, such as a wireless transceiver on a base station 105 (e.g., base station 105-*c*). The transceiver 935 may also include a modem to modulate the packets and provide the modulated packets to the antennas 940 for transmission, and to demodulate packets received from the antennas 940.

In some cases, the wireless device may include a single antenna 940. However, in other cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
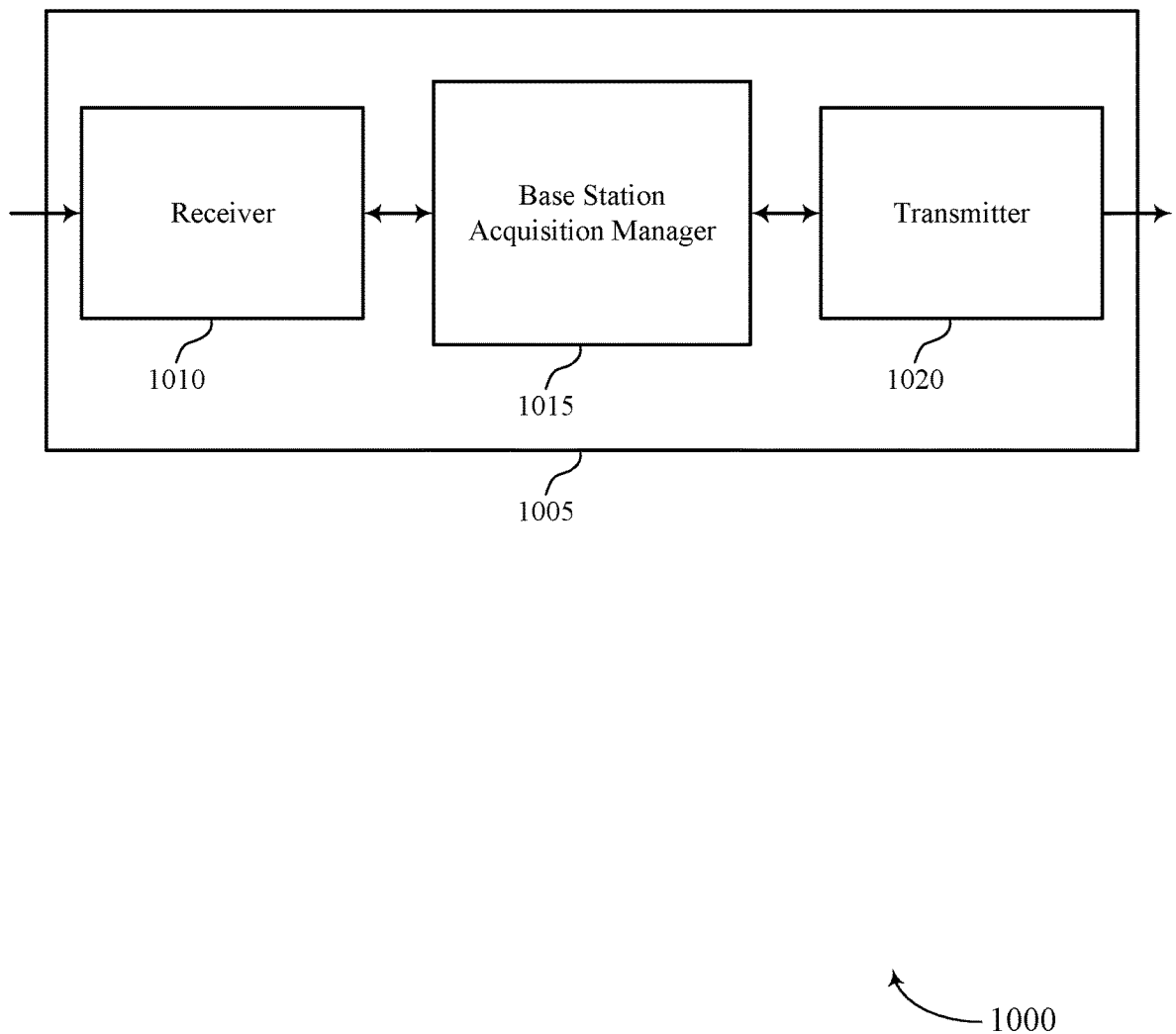
FIGS. 10 through 12 show block diagrams of a device that supports system acquisition in a shared radio frequency spectrum band in accordance with aspects of the present disclosure.

FIG. 10 shows a block diagram 1000 of a wireless device 1005 that supports system acquisition in a shared radio frequency spectrum in accordance with aspects of the present disclosure. Wireless device 1005 may be an example of aspects of a base station 105 as described herein. Wireless device 1005 may include receiver 1010, base station acquisition manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to system acquisition in a shared radio frequency spectrum, etc.). Information may be passed on to other components of the device. The receiver 1010 may be an example of aspects of a transceiver 1335 described with reference to FIG. 13. The receiver 1010 may utilize a single antenna or a set of antennas.

Base station acquisition manager 1015 may be an example of aspects of the base station acquisition manager 1315 described with reference to FIG. 13. Base station acquisition manager 1015 and/or at least some of its various sub-components may be implemented in hardware, software executed by a processor, firmware, or any combination thereof. If implemented in software executed by a processor, the functions of the base station acquisition manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station acquisition manager 1015 and/or at least some of its various sub-components may be physically located at various positions, including being distributed such that portions of functions are implemented at different physical locations by one or more physical devices. In some examples, base station acquisition manager 1015 and/or at least some of its various sub-components may be a separate and distinct component in accordance with various aspects of the present disclosure. In other examples, base station acquisition manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station acquisition manager 1015 may identify, at a base station, an LBT mode of the base station, and may transmit, over a shared radio frequency spectrum band, a transmission including an indication of the LBT mode of the base station. Base station acquisition manager 1015 may further transmit a PBCH transmission according to a PBCH configuration, the PBCH configuration based on the LBT mode of the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
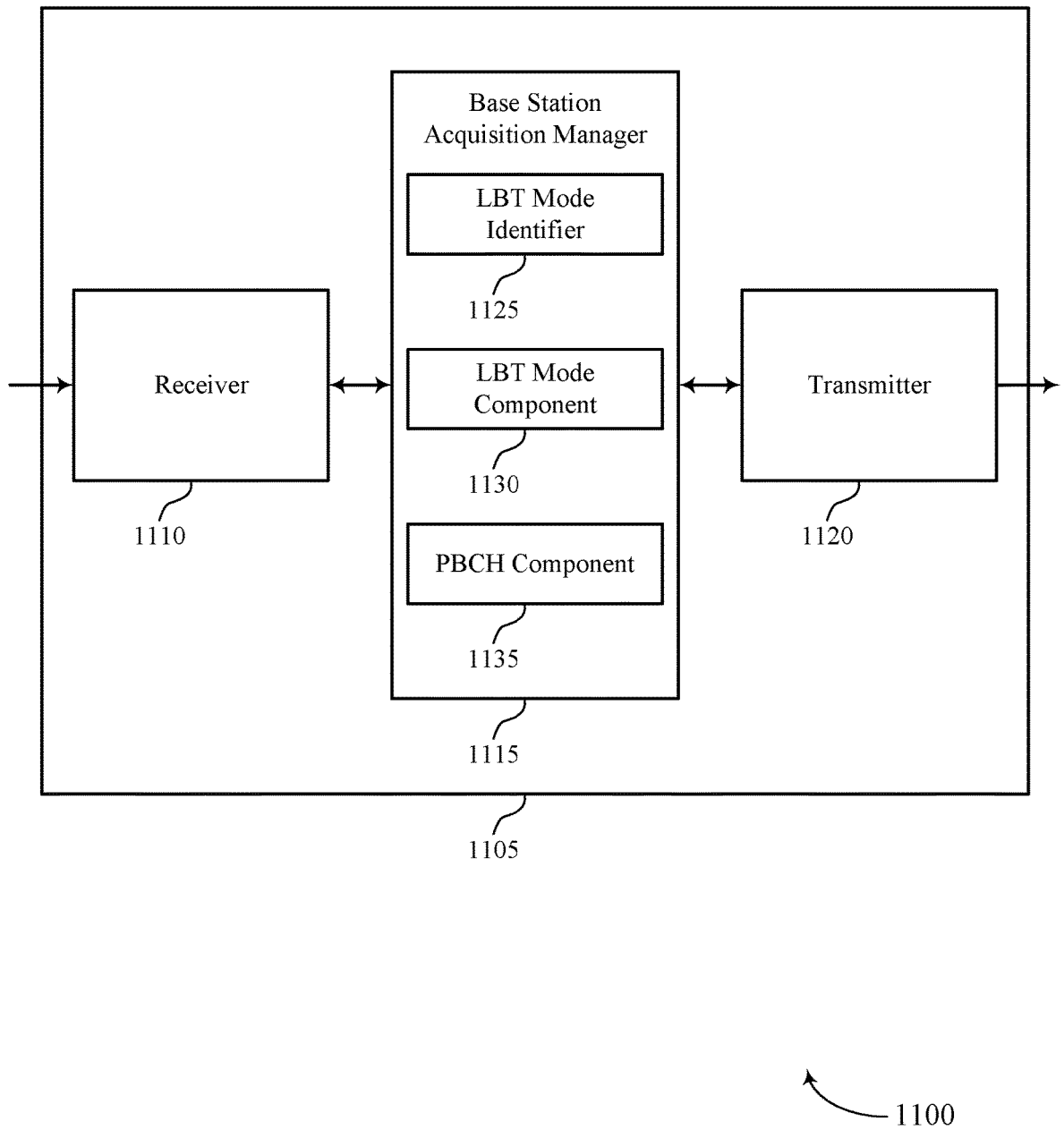

FIG. 11 shows a block diagram 1100 of a wireless device 1105 that supports system acquisition in a shared radio frequency spectrum in accordance with aspects of the present disclosure. Wireless device 1105 may be an example of aspects of a wireless device 1005 or a base station 105 as described with reference to FIG. 10. Wireless device 1105 may include receiver 1110, base station acquisition manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to system acquisition in a shared radio frequency spectrum, etc.). Information may be passed on to other components of the device. The receiver 1110 may be an example of aspects of the transceiver 1335 described with reference to FIG. 13. The receiver 1110 may utilize a single antenna or a set of antennas.

Base station acquisition manager 1115 may be an example of aspects of the base station acquisition manager 1315 described with reference to FIG. 13. Base station acquisition manager 1115 may also include LBT mode identifier 1125, LBT mode component 1130, and PBCH component 1135.

LBT mode identifier 1125 may identify, at a base station, an LBT mode of the base station. LBT mode component 1130 may transmit, over a shared radio frequency spectrum band, a transmission including an indication of the LBT mode of the base station. In some cases, the transmission further includes a synchronization signal. In some cases, the synchronization signal includes a cell identifier, the cell identifier including the indication of the LBT mode of the base station.

PBCH component 1135 may transmit a PBCH transmission according to a PBCH configuration, the PBCH configuration based on the LBT mode of the base station. In some cases, the PBCH transmission includes subframe timing information, frame timing information, a frequency hopping bandwidth, a number of hopping frequencies, a location of system information, a frame structure for a data channel, or any combination thereof. In some cases, the PBCH transmission is transmitted in a number of subframes following the synchronization signal, where the number of subframes is based on the LBT mode of the base station.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
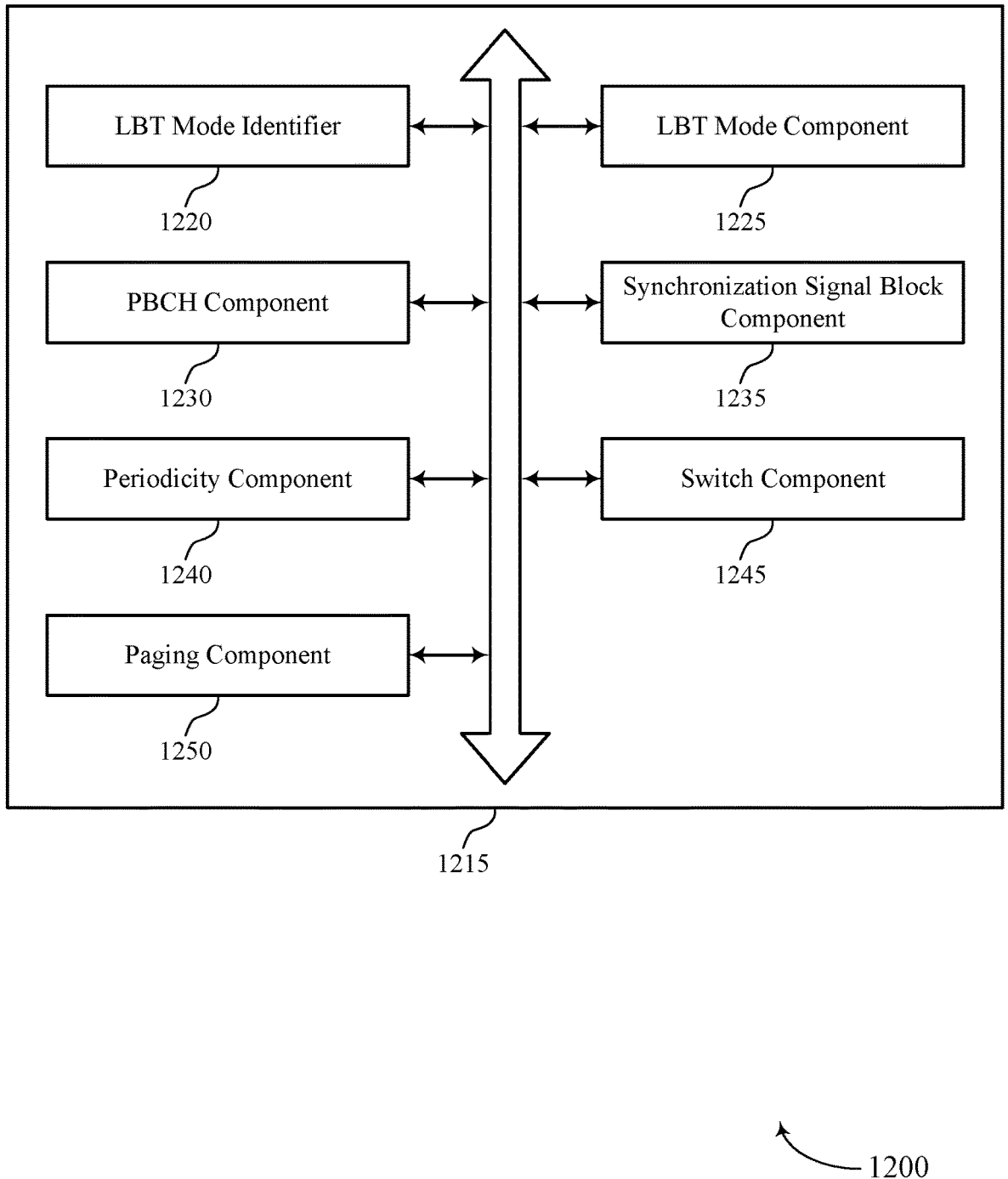

FIG. 12 shows a block diagram 1200 of a base station acquisition manager 1215 that supports system acquisition in a shared radio frequency spectrum in accordance with aspects of the present disclosure. The base station acquisition manager 1215 may be an example of aspects of a base station acquisition manager, as described with reference to FIGS. 10, 11, and 13. The base station acquisition manager 1215 may include LBT mode identifier 1220, LBT mode component 1225, PBCH component 1230, synchronization signal block component 1235, periodicity component 1240, switch component 1245, and paging component 1250. Each of these modules may communicate, directly or indirectly, with one another (e.g., via one or more buses).

LBT mode identifier 1220 may identify, at a base station, an LBT mode of the base station. LBT mode component 1225 may transmit, over a shared radio frequency spectrum band, a transmission including an indication of the LBT mode of the base station. In some cases, the transmission further includes a synchronization signal. In some cases, the synchronization signal includes a cell identifier, the cell identifier including the indication of the LBT mode of the base station.

PBCH component 1230 may transmit a PBCH transmission according to a PBCH configuration, the PBCH configuration based on the LBT mode of the base station. In some cases, the PBCH transmission includes subframe timing information, frame timing information, a frequency hopping bandwidth, a number of hopping frequencies, a location of system information, a frame structure for a data channel, or any combination thereof. In some cases, the PBCH transmission is transmitted in a number of subframes following the synchronization signal, where the number of subframes is based on the LBT mode of the base station.

Synchronization signal block component 1235 may transmit a synchronization signal block according to a synchronization signal block periodicity, the synchronization signal block periodicity based on the LBT mode of the base station.

Periodicity component 1240 may transmit, on an anchor frequency, one or more transmissions according to a transmission periodicity, the transmission periodicity based on the LBT mode of the base station.

Switch component 1245 may perform an LBT mode switch including changing from the LBT mode of the base station to a second LBT mode of the base station. In some cases, performing the LBT mode switch includes transmitting a paging message to a UE, the paging message indicating the LBT mode switch. In other cases, performing the LBT mode switch is based on an LBT mode configuration period. In some cases, performing the LBT mode switch is based on a channel congestion threshold associated with the shared radio frequency spectrum band. Paging component 1250 may transmit a message indicating the LBT mode configuration period.

Figure 13:
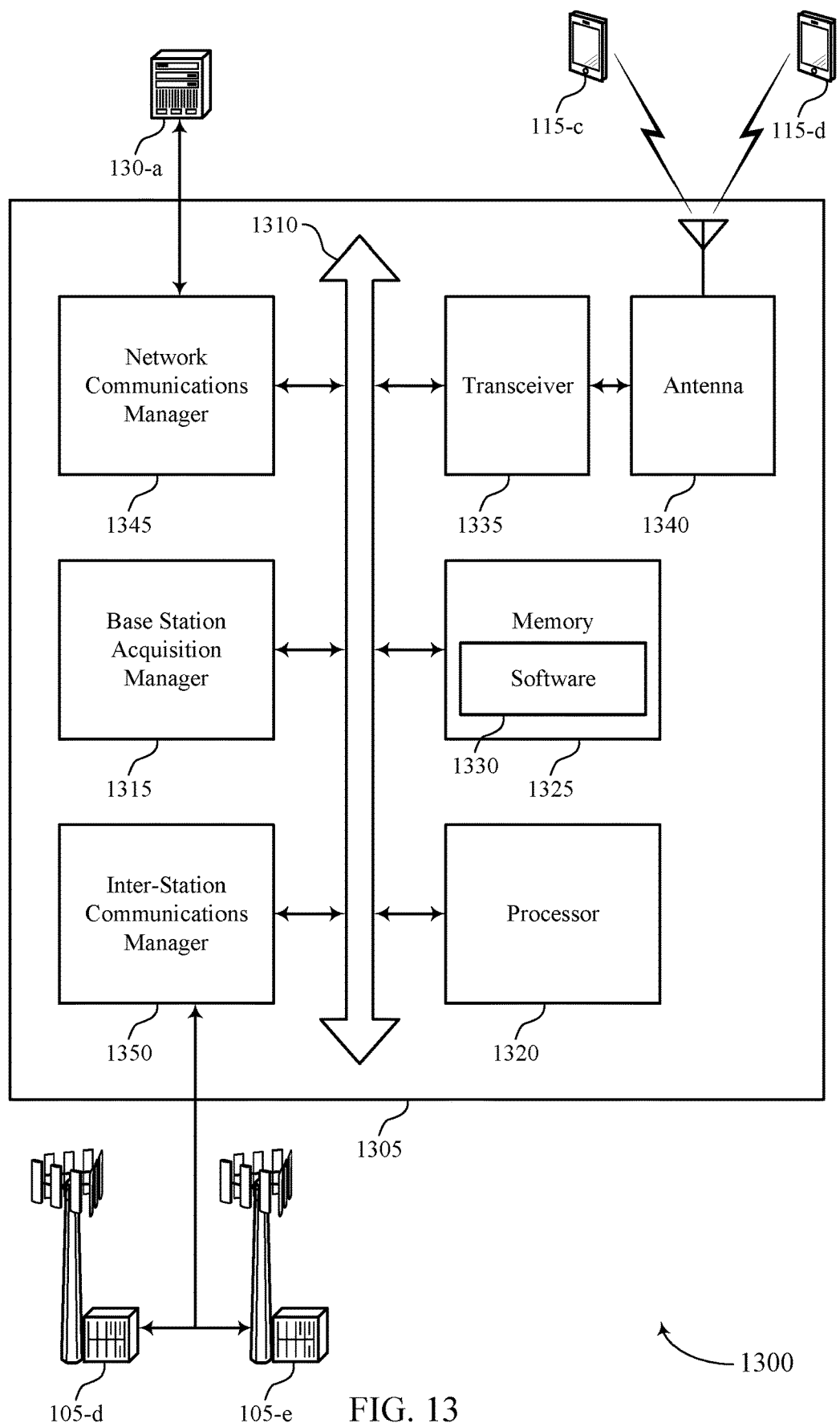
FIG. 13 illustrates a block diagram of a system including a base station that supports system acquisition in a shared radio frequency spectrum band in accordance with aspects of the present disclosure.

FIG. 13 shows a diagram of a system 1300 including a device 1305 that supports system acquisition in a shared radio frequency spectrum in accordance with aspects of the present disclosure. Device 1305 may be an example of or include the components of a wireless device 1005 or 1105 or a base station 105 as described above, e.g., with reference to FIGS. 1 through 5, 10, and 11. Device 1305 may include components for bi-directional voice and data communications including components for transmitting and receiving communications, including base station acquisition manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115 or base stations 105.

Processor 1320 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting system acquisition in a shared radio frequency spectrum).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support system acquisition in a shared radio frequency spectrum. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver, such as wireless transceivers on one or more UEs 115 (e.g., UEs 115-c and 115-d). The transceiver 1335 may also include a modem to modulate the packets and provide the modulated packets to the antennas for transmission, and to demodulate packets received from the antennas.

In some cases, the wireless device may include a single antenna 1340. However, in other cases the device may have more than one antenna 1340, which may be capable of concurrently transmitting or receiving multiple wireless transmissions.

Network communications manager 1345 may manage communications with the core network 130-a (e.g., via one or more wired backhaul links). For example, the network communications manager 1345 may manage the transfer of data communications for client devices, such as one or more UEs 115.

Inter-station communications manager 1350 may manage communications with other base stations 105 (e.g., base stations 105-d and 105-e), and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
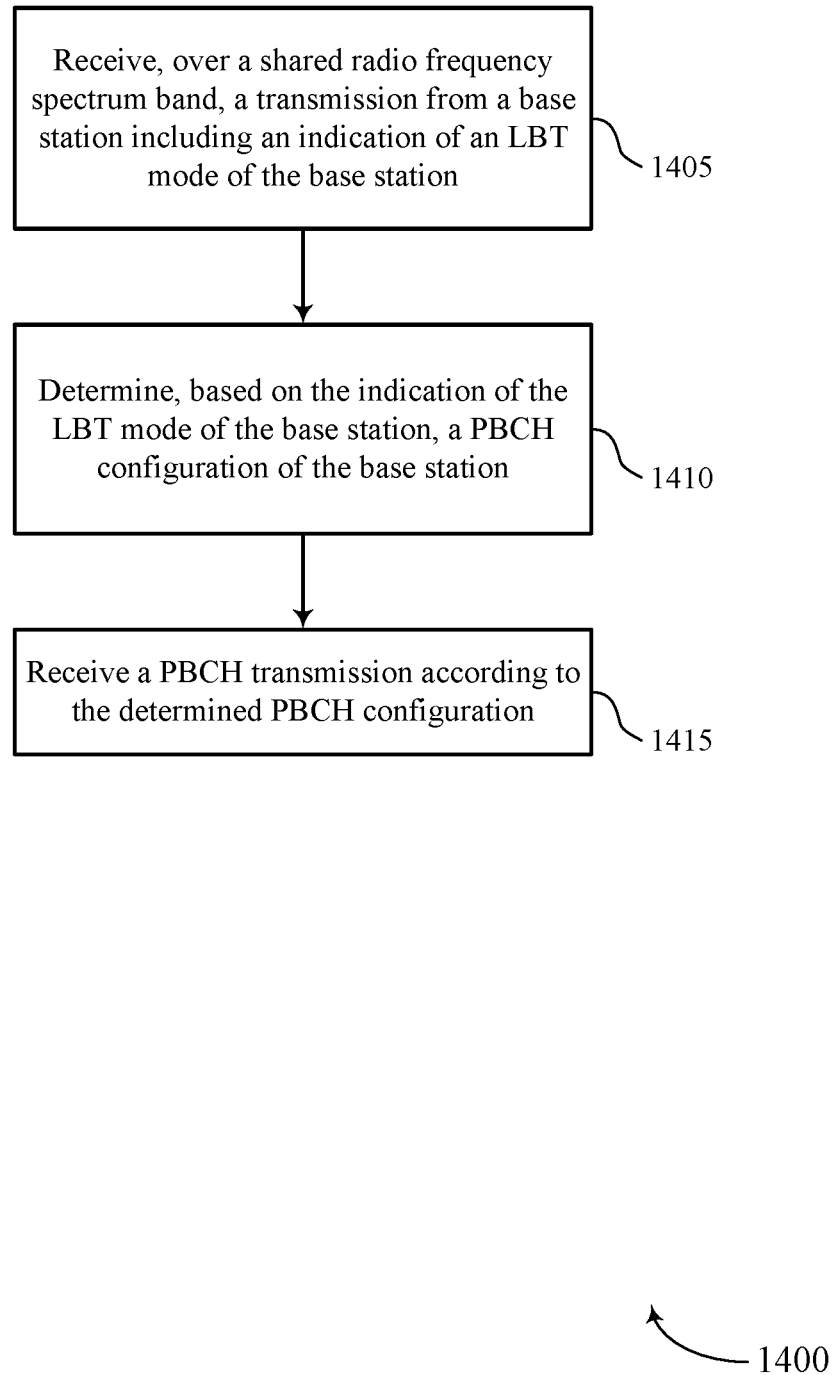
FIGS. 14 through 19 illustrate methods for system acquisition in a shared radio frequency spectrum band in accordance with aspects of the present disclosure.

FIG. 14 shows a flowchart illustrating a method 1400 for system acquisition in a shared radio frequency spectrum in accordance with aspects of the present disclosure. The operations of method 1400 may be implemented by a UE 115 or its components as described herein. For example, the operations of method 1400 may be performed by a UE acquisition manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, over a shared radio frequency spectrum band, a transmission from a base station comprising an indication of an LBT mode of the base station. The operations of block 1405 may be performed according to the methods described herein. In certain examples, aspects of the operations of block 1405 may be performed by an LBT mode component as described with reference to FIGS. 6 through 9.

At block 1410 the UE 115 may determine, based at least in part on the indication of the LBT mode of the base station, a PBCH configuration of the base station. The operations of block 1410 may be performed according to the methods described herein. In certain examples, aspects of the operations of block 1410 may be performed by a PBCH configuration identifier as described with reference to FIGS. 6 through 9.

At block 1415 the UE 115 may receive a PBCH transmission according to the determined PBCH configuration. The operations of block 1415 may be performed according to the methods described herein. In certain examples, aspects of the operations of block 1415 may be performed by a PBCH component as described with reference to FIGS. 6 through 9.

Figure 15:
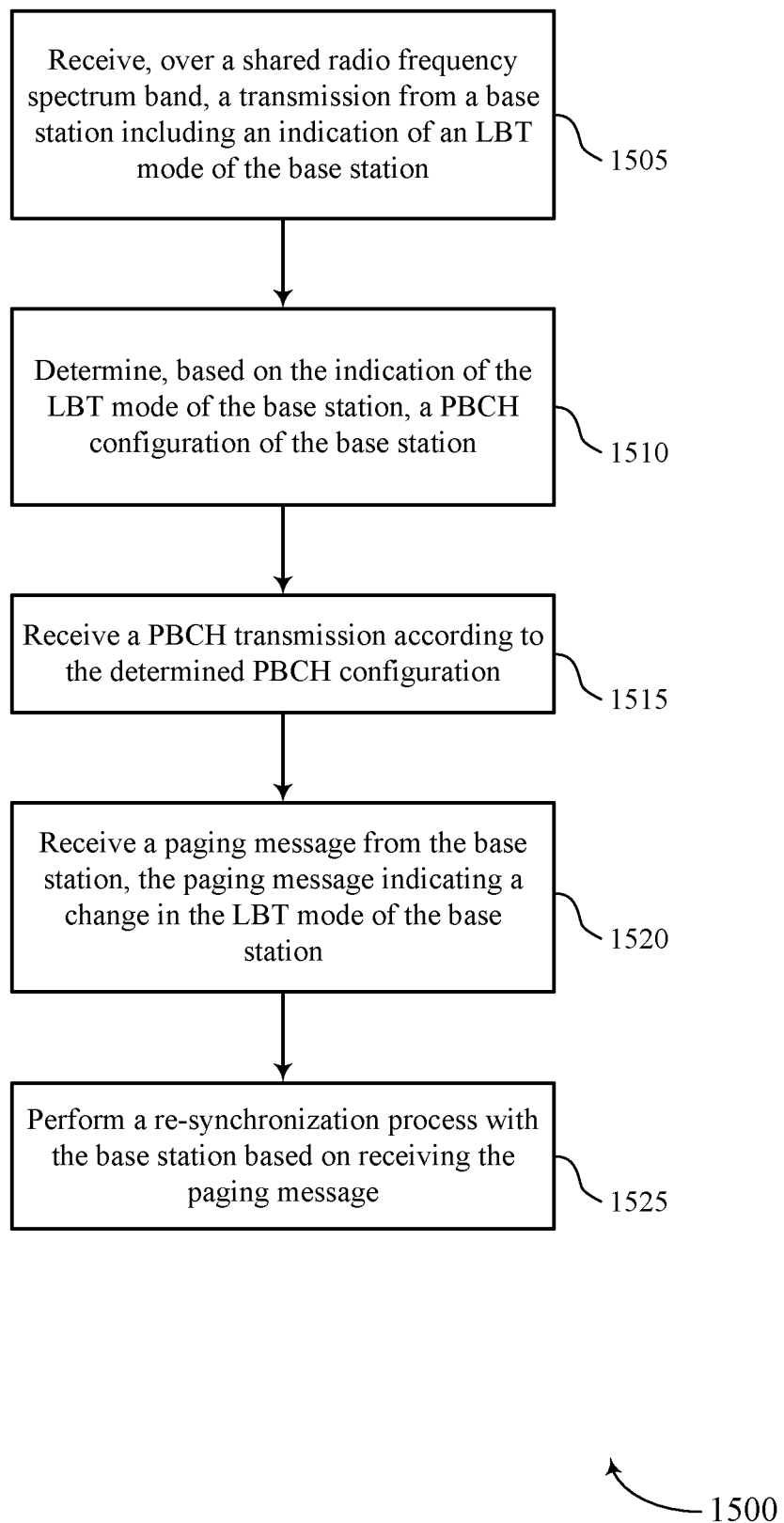

FIG. 15 shows a flowchart illustrating a method 1500 for system acquisition in a shared radio frequency spectrum in accordance with aspects of the present disclosure. The operations of method 1500 may be implemented by a UE 115 or its components as described herein. For example, the operations of method 1500 may be performed by a UE acquisition manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, over a shared radio frequency spectrum band, a transmission from a base station comprising an indication of an LBT mode of the base station. The operations of block 1505 may be performed according to the methods described herein. In certain examples, aspects of the operations of block 1505 may be performed by an LBT mode component as described with reference to FIGS. 6 through 9.

At block 1510 the UE 115 may determine, based at least in part on the indication of the LBT mode of the base station, a PBCH configuration of the base station. The operations of block 1510 may be performed according to the methods described herein. In certain examples, aspects of the operations of block 1510 may be performed by a PBCH configuration identifier as described with reference to FIGS. 6 through 9.

At block 1515 the UE 115 may receive a PBCH transmission according to the determined PBCH configuration. The operations of block 1515 may be performed according to the methods described herein. In certain examples, aspects of the operations of block 1515 may be performed by a PBCH component as described with reference to FIGS. 6 through 9.

At block 1520 the UE 115 may receive a paging message from the base station, the paging message indicating a change in the LBT mode of the base station. The operations of block 1520 may be performed according to the methods described herein. In certain examples, aspects of the operations of block 1520 may be performed by a switch identifier as described with reference to FIGS. 6 through 9.

At block 1525 the UE 115 may perform a re-synchronization process with the base station based at least in part on receiving the paging message. The operations of block 1525 may be performed according to the methods described herein. In certain examples, aspects of the operations of block 1525 may be performed by a re-synchronization component as described with reference to FIGS. 6 through 9.

Figure 16:
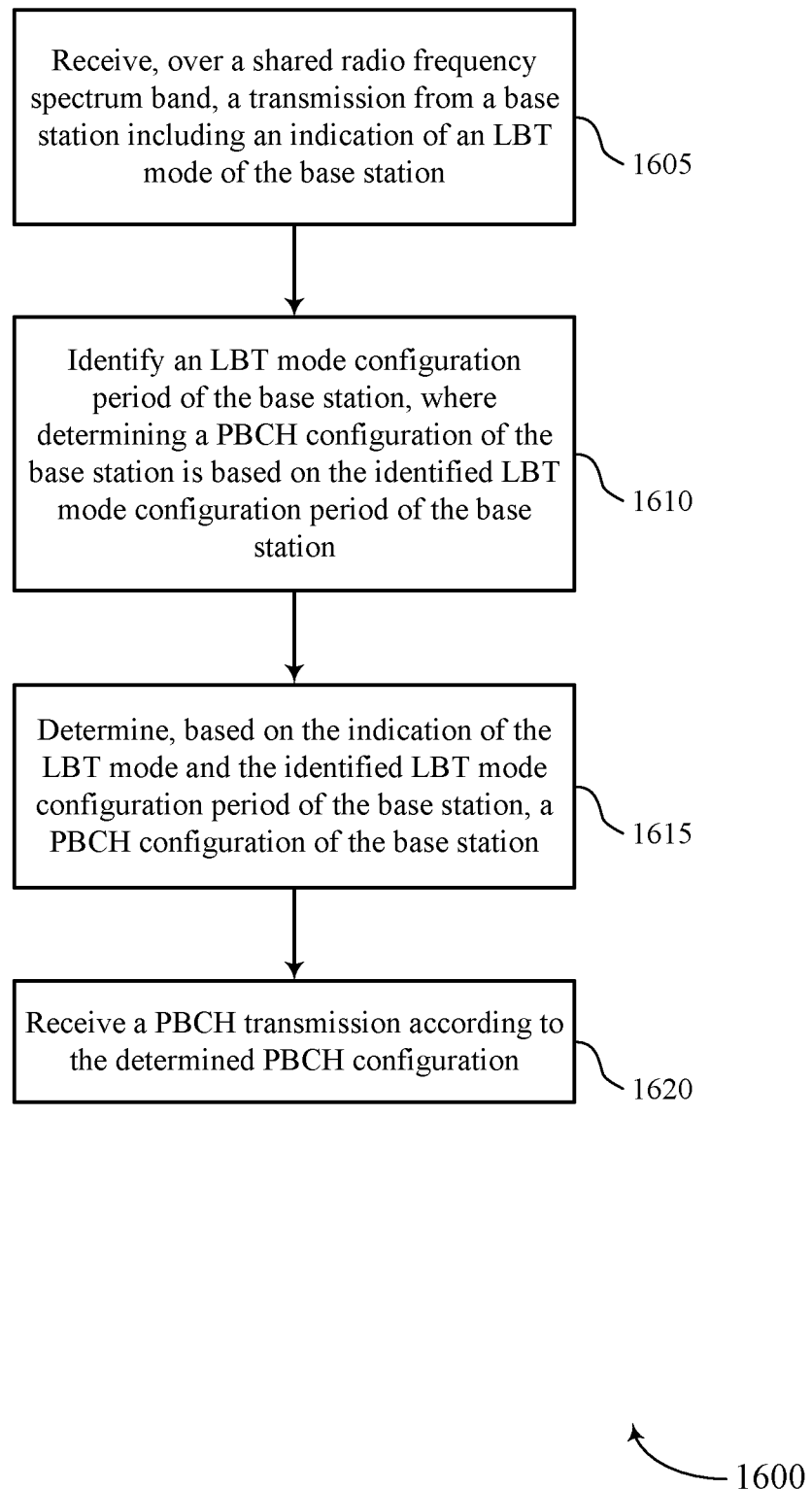

FIG. 16 shows a flowchart illustrating a method 1600 for system acquisition in a shared radio frequency spectrum in accordance with aspects of the present disclosure. The operations of method 1600 may be implemented by a UE 115 or its components as described herein. For example, the operations of method 1600 may be performed by a UE acquisition manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, over a shared radio frequency spectrum band, a transmission from a base station comprising an indication of an LBT mode of the base station. The operations of block 1605 may be performed according to the methods described herein. In certain examples, aspects of the operations of block 1605 may be performed by an LBT mode component as described with reference to FIGS. 6 through 9.

At block 1610 the UE 115 may identify an LBT mode configuration period of the base station, wherein determining a PBCH configuration of the base station is based at least in part on the identified LBT mode configuration period of the base station. The operations of block 1610 may be performed according to the methods described herein. In certain examples, aspects of the operations of block 1610 may be performed by an LBT mode period identifier as described with reference to FIGS. 6 through 9.

At block 1615 the UE 115 may determine, based at least in part on the indication of the LBT mode of the base station and the identified LBT mode configuration period of the base station, a PBCH configuration of the base station. The operations of block 1615 may be performed according to the methods described herein. In certain examples, aspects of the operations of block 1615 may be performed by a PBCH configuration identifier as described with reference to FIGS. 6 through 9.

At block 1620 the UE 115 may receive a PBCH transmission according to the determined PBCH configuration. The operations of block 1620 may be performed according to the methods described herein. In certain examples, aspects of the operations of block 1620 may be performed by a PBCH component as described with reference to FIGS. 6 through 9.

Figure 17:
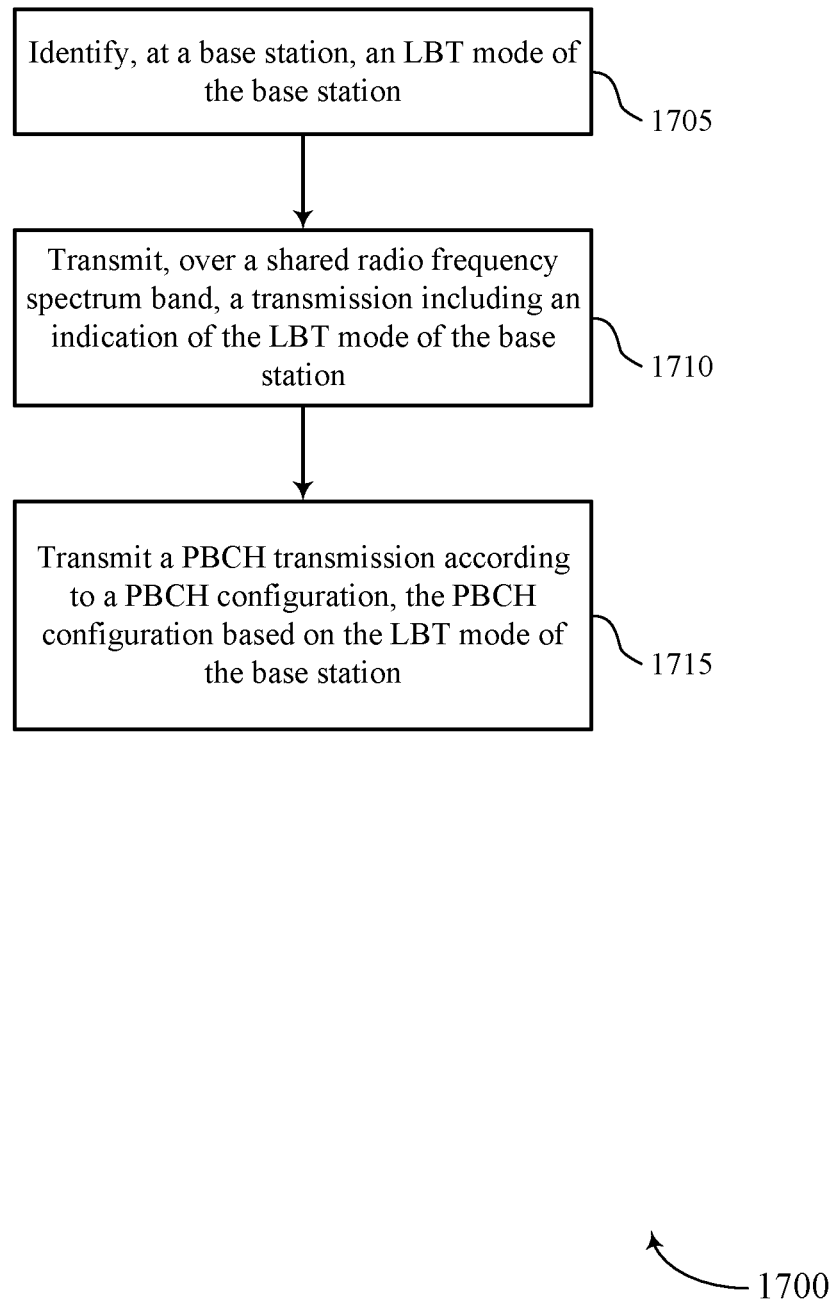

FIG. 17 shows a flowchart illustrating a method 1700 for system acquisition in a shared radio frequency spectrum in accordance with aspects of the present disclosure. The operations of method 1700 may be implemented by a base station 105 or its components as described herein. For example, the operations of method 1700 may be performed by a base station acquisition manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify an LBT mode of the base station. The operations of block 1705 may be performed according to the methods described herein. In certain examples, aspects of the operations of block 1705 may be performed by an LBT mode identifier as described with reference to FIGS. 10 through 13.

At block 1710 the base station 105 may transmit, over a shared radio frequency spectrum band, a transmission comprising an indication of the LBT mode of the base station. The operations of block 1710 may be performed according to the methods described herein. In certain examples, aspects of the operations of block 1710 may be performed by an LBT mode component as described with reference to FIGS. 10 through 13.

At block 1715 the base station 105 may transmit a PBCH transmission according to a PBCH configuration, the PBCH configuration based at least in part on the LBT mode of the base station. The operations of block 1715 may be performed according to the methods described herein. In certain examples, aspects of the operations of block 1715 may be performed by a PBCH component as described with reference to FIGS. 10 through 13.

Figure 18:
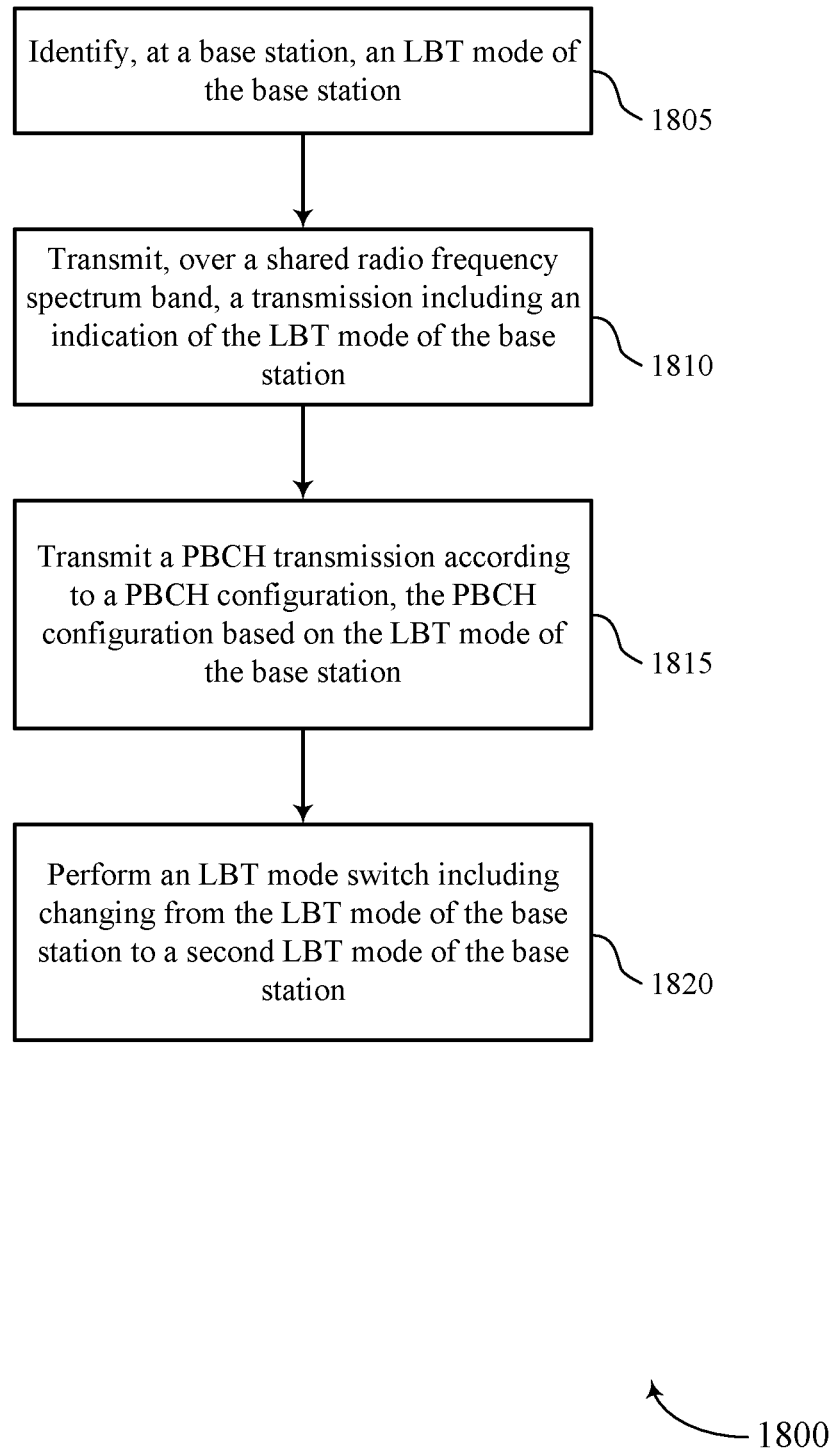

FIG. 18 shows a flowchart illustrating a method 1800 for system acquisition in a shared radio frequency spectrum in accordance with aspects of the present disclosure. The operations of method 1800 may be implemented by a base station 105 or its components as described herein. For example, the operations of method 1800 may be performed by a base station acquisition manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify an LBT mode of the base station. The operations of block 1805 may be performed according to the methods described herein. In certain examples, aspects of the operations of block 1805 may be performed by an LBT mode identifier as described with reference to FIGS. 10 through 13.

At block 1810 the base station 105 may transmit, over a shared radio frequency spectrum band, a transmission comprising an indication of the LBT mode of the base station.

The operations of block 1810 may be performed according to the methods described herein. In certain examples, aspects of the operations of block 1810 may be performed by an LBT mode component as described with reference to FIGS. 10 through 13.

At block 1815 the base station 105 may transmit a PBCH transmission according to a PBCH configuration, the PBCH configuration based at least in part on the LBT mode of the base station. The operations of block 1815 may be performed according to the methods described herein. In certain examples, aspects of the operations of block 1815 may be performed by a PBCH component as described with reference to FIGS. 10 through 13.

At block 1820 the base station 105 may perform an LBT mode switch comprising changing from the LBT mode of the base station to a second LBT mode of the base station. In some cases, performing the LBT mode switch may include transmitting a paging message to a UE 115, the paging message indicating the LBT mode switch. The operations of block 1820 may be performed according to the methods described herein. In certain examples, aspects of the operations of block 1820 may be performed by a switch component as described with reference to FIGS. 10 through 13.

Figure 19:
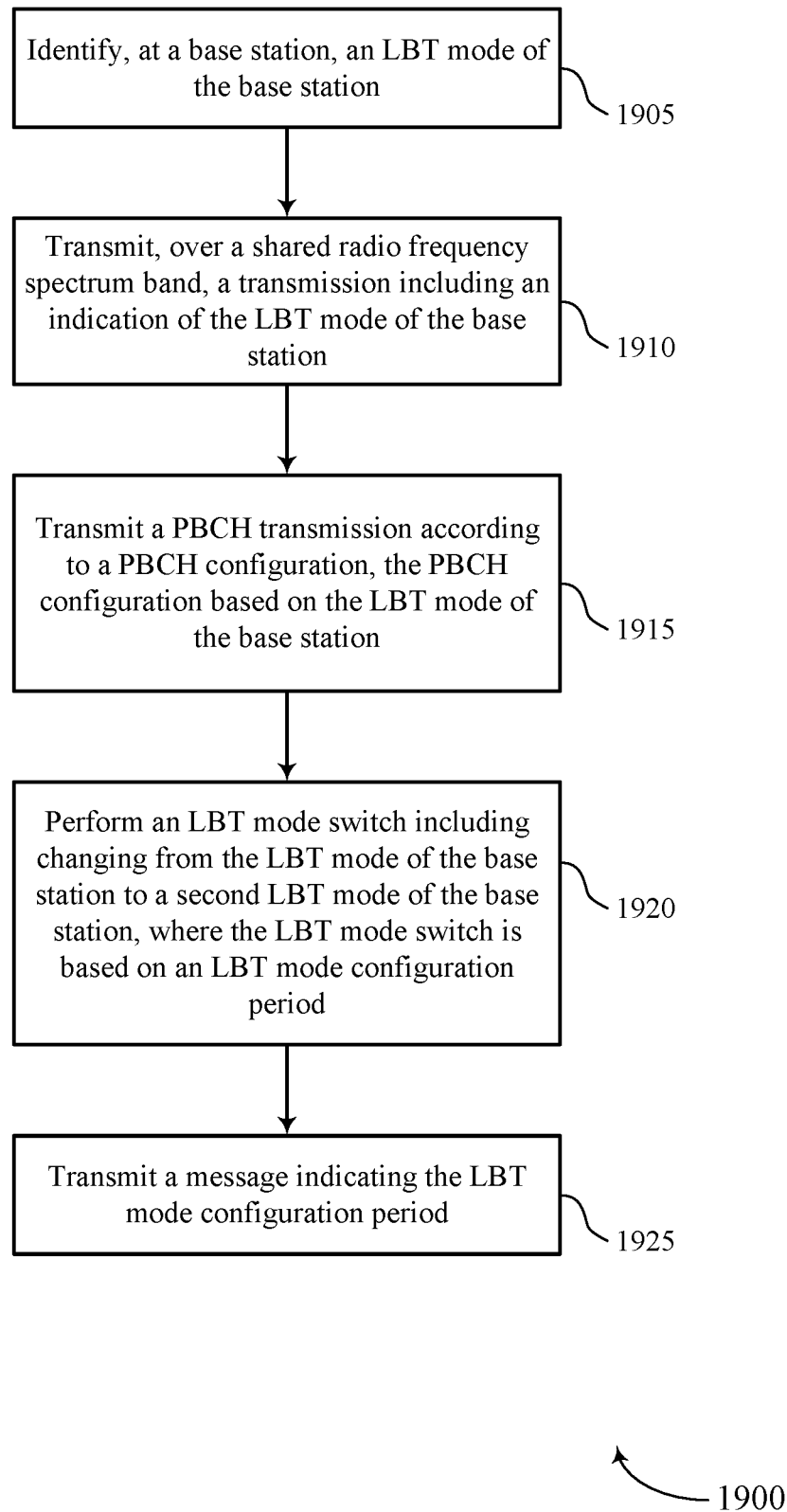

FIG. 19 shows a flowchart illustrating a method 1900 for system acquisition in a shared radio frequency spectrum in accordance with aspects of the present disclosure. The operations of method 1900 may be implemented by a base station 105 or its components as described herein. For example, the operations of method 1900 may be performed by a base station acquisition manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify, at a base station, an LBT mode of the base station. The operations of block 1905 may be performed according to the methods described herein. In certain examples, aspects of the operations of block 1905 may be performed by an LBT mode identifier as described with reference to FIGS. 10 through 13.

At block 1910 the base station 105 may transmit, over a shared radio frequency spectrum band, a transmission comprising an indication of the LBT mode of the base station. The operations of block 1910 may be performed according to the methods described herein. In certain examples, aspects of the operations of block 1910 may be performed by an LBT mode component as described with reference to FIGS. 10 through 13.

At block 1915 the base station 105 may transmit a PBCH transmission according to a PBCH configuration, the PBCH configuration based at least in part on the LBT mode of the base station. The operations of block 1915 may be performed according to the methods described herein. In certain examples, aspects of the operations of block 1915 may be performed by a PBCH component as described with reference to FIGS. 10 through 13.

At block 1920 the base station 105 may perform an LBT mode switch comprising changing from the LBT mode of the base station to a second LBT mode of the base station. In some cases, performing the LBT mode switch is based at least in part on an LBT mode configuration period. The operations of block 1920 may be performed according to the methods described herein. In certain examples, aspects of the operations of block 1920 may be performed by a switch component as described with reference to FIGS. 10 through 13.

At block 1925 the base station 105 may transmit a message indicating the LBT mode configuration period. The operations of block 1925 may be performed according to the methods described herein. In certain examples, aspects of the operations of block 1925 may be performed by a paging component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving, over a shared radio frequency spectrum band, a transmission from a base station comprising an indication of a listen before talk (LBT) mode of the base station, wherein the indication of the LBT mode indicates whether the base station is in an LBT enabled mode or a non-LBT enabled mode;
determining, based at least in part on the LBT mode of the base station indicated by the indication, a physical broadcast channel (PBCH) configuration of the base station, wherein the PBCH configuration is associated with one of an LBT enabled transmission schedule or a non-LBT enabled transmission schedule; and
receiving a PBCH transmission according to the determined PBCH configuration.

2. The method of claim 1, wherein determining the PBCH configuration of the base station comprises determining a periodicity of a synchronization signal block based at least in part on the LBT mode of the base station.

3. The method of claim 1, wherein determining the PBCH configuration of the base station comprises determining a periodicity of transmissions from the base station on an anchor frequency based at least in part on the LBT mode of the base station.

4. The method of claim 1, wherein determining the PBCH configuration of the base station comprises determining, based at least in part on the LBT mode of the base station, a number of subframes that follow a synchronization signal transmission.

5. The method of claim 4, wherein receiving the PBCH transmission comprises receiving, based at least in part on the determined number of subframes, the PBCH transmission over one or more subframes following the synchronization signal transmission, and the method further comprising:
decoding a master information block (MIB) based at least in part on the PBCH transmission.

6. The method of claim 1, further comprising:
receiving a second PBCH transmission according to the determined PBCH configuration; and
decoding a MIB based at least in part on the PBCH transmission and the second PBCH transmission.

7. The method of claim 1, further comprising:
receiving a paging message from the base station, the paging message indicating a change in the LBT mode of the base station.

8. The method of claim 7, further comprising:
performing a re-synchronization process with the base station based at least in part on receiving the paging message.

9. The method of claim 1, further comprising:
identifying an LBT mode configuration period of the base station, wherein determining the PBCH configuration of the base station is based at least in part on the identified LBT mode configuration period of the base station.

10. The method of claim 1, wherein the PBCH transmission comprises subframe timing information, frame timing information, a frequency hopping bandwidth, a number of hopping frequencies, a location of system information, a frame structure for a data channel, or any combination thereof.

11. The method of claim 1, wherein the transmission from the base station comprises a synchronization signal.

12. The method of claim 11, wherein the synchronization signal comprises a cell identifier, the cell identifier comprising the indication of the LBT mode of the base station.

13. A method for wireless communications, comprising:
identifying, at a base station, a listen before talk (LBT) mode of the base station;
transmitting, over a shared radio frequency spectrum band, a transmission comprising an indication of the LBT mode of the base station, wherein the indication of the LBT mode indicates whether the base station is in an LBT enabled mode or a non-LBT enabled mode; and
transmitting a physical broadcast channel (PBCH) transmission according to a PBCH configuration, the PBCH configuration based at least in part on the LBT mode of the base station and associated with one of an LBT enabled transmission schedule or a non-LBT enabled transmission schedule.

14. The method of claim 13, further comprising:
transmitting a synchronization signal block according to a synchronization signal block periodicity, the synchronization signal block periodicity based at least in part on the LBT mode of the base station.

15. The method of claim 13, further comprising:
transmitting, on an anchor frequency, one or more transmissions according to a transmission periodicity, the transmission periodicity based at least in part on the LBT mode of the base station.

16. The method of claim 13, further comprising:
performing an LBT mode switch comprising changing from the LBT mode of the base station to a second LBT mode of the base station, wherein the LBT mode switch is between the LBT enabled mode and the non-LBT enabled mode.

17. The method of claim 16, wherein performing the LBT mode switch comprises transmitting a paging message to a user equipment (UE), the paging message indicating the LBT mode switch.

18. The method of claim 16, wherein performing the LBT mode switch is based at least in part on an LBT mode configuration period.

19. The method of claim 18, further comprising:
transmitting a message indicating the LBT mode configuration period.

20. The method of claim 16, wherein performing the LBT mode switch is based at least in part on a channel congestion threshold associated with the shared radio frequency spectrum band.

21. The method of claim 13, wherein the PBCH transmission comprises subframe timing information, frame timing information, a frequency hopping bandwidth, a number of hopping frequencies, a location of system information, a frame structure for a data channel, or any combination thereof.

22. The method of claim 13, wherein the transmission further comprises a synchronization signal.

23. The method of claim 22, wherein the PBCH transmission is transmitted in a number of subframes following the synchronization signal, wherein the number of subframes is based at least in part on the LBT mode of the base station.

24. The method of claim 22, wherein the synchronization signal comprises a cell identifier, the cell identifier comprising the indication of the LBT mode of the base station.

25. An apparatus for wireless communications, comprising:
a processor;
memory in electronic communication with the processor; and
instructions stored in the memory, wherein the instructions are executable by the processor to:
receive, over a shared radio frequency spectrum band, a transmission from a base station comprising an indication of a listen before talk (LBT) mode of the base station, wherein the indication of the LBT mode indicates whether the base station is in an LBT enabled mode or a non-LBT enabled mode;
determine, based at least in part on the LBT mode of the base station indicated by the indication, a physical broadcast channel (PBCH) configuration of the base station, wherein the PBCH configuration is associated with one of an LBT enabled transmission schedule or a non-LBT enabled transmission schedule; and
receive a PBCH transmission according to the determined PBCH configuration.

26. The apparatus of claim 25, wherein determining the PBCH configuration of the base station comprises determining a periodicity of a synchronization signal block based at least in part on the LBT mode of the base station.

27. The apparatus of claim 25, wherein determining the PBCH configuration of the base station comprises determining a periodicity of transmissions from the base station on an anchor frequency based at least in part on the LBT mode of the base station.

28. The apparatus of claim 25, wherein determining the PBCH configuration of the base station comprises determining, based at least in part on the LBT mode of the base station, a number of subframes that follow a synchronization signal transmission.

29. The apparatus of claim 25, wherein the instructions are further executable by the processor to:
receive a second PBCH transmission according to the determined PBCH configuration; and
decode a MIB based at least in part on the PBCH transmission and the second PBCH transmission.

30. An apparatus for wireless communications, comprising:
a processor;
memory in electronic communication with the processor; and
instructions stored in the memory, wherein the instructions are executable by the processor to:
identify, at a base station, a listen before talk (LBT) mode of the base station;
transmit, over a shared radio frequency spectrum band, a transmission comprising an indication of the LBT mode of the base station, wherein the indication of the LBT mode indicates whether the base station is in an LBT enabled mode or a non-LBT enabled mode; and
transmit a physical broadcast channel (PBCH) transmission according to a PBCH configuration, the PBCH configuration based at least in part on the LBT mode of the base station and associated with one of an LBT enabled transmission schedule or a non-LBT enabled transmission schedule.

* * * * *